(12) United States Patent
Aikawa et al.

(10) Patent No.: US 7,496,261 B2
(45) Date of Patent: *Feb. 24, 2009

(54) DISPERSION COMPENSATING OPTICAL FIBER AND DISPERSION COMPENSATING OPTICAL FIBER MODULE

(75) Inventors: Kazuhiko Aikawa, Sakura (JP); Yutaka Nagasawa, Sakura (JP); Shogo Shimizu, Sakura (JP); Takaaki Suzuki, Sakura (JP); Masakazu Nakayama, Sakura (JP); Kuniharu Himeno, Sakura (JP); Ryozo Yamauchi, Sakura (JP); Keiji Ohashi, Sakura (JP); Munehisa Fujimaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 11/203,890

(22) Filed: Aug. 15, 2005

(65) Prior Publication Data
US 2006/0062534 A1 Mar. 23, 2006

Related U.S. Application Data

(63) Continuation-in-part of application No. 10/104,916, filed on Mar. 21, 2002, now Pat. No. 6,965,719.

(30) Foreign Application Priority Data
Jun. 26, 2001 (JP) ............................ P2001-193556

(51) Int. Cl.
*G02B 6/036* (2006.01)
(52) U.S. Cl. ..................................... 385/127
(58) Field of Classification Search .......... 385/123–128
See application file for complete search history.

(56) References Cited

U.S. PATENT DOCUMENTS 3,980,390 A 9/1976 Yamamoto et al.

(Continued)

FOREIGN PATENT DOCUMENTS

EP 1 083 446 A2 3/2001

(Continued)

OTHER PUBLICATIONS

Kashiwada, T., et al., "Broadband Dispersion Compensating Module Considering its Attenuation Spectrum Behavior for WDM System," OFC IOOC '99 Technical Digest, Optical Fiber Communication Conference and the International Conference of Integrated Optics and Optical Fiber Communication, San Diego Convention Center, San Diego, California, Feb. 21-26, 1999, pp. 229-231.

(Continued)

*Primary Examiner*—Sarah Song
(74) *Attorney, Agent, or Firm*—Bell, Boyd & Lloyd LLP

(57) ABSTRACT

A dispersion compensating optical fiber for NZ-DSFs, includes: an uncovered dispersion compensating optical fiber; a double-layered resin coating disposed around the uncovered dispersion compensating optical fiber; and an outer coating layer having a thickness of 3 to 7 μm, containing silicone in an amount of 1 to 5% by weight, and disposed around the double-layered resin coating. The outer diameter of the uncovered dispersion compensating optical fiber is in a range from 90 to 125 μm, an outer diameter of the dispersion compensating optical fiber is in a range from 180 to 250 μm, and the amount of silicone contained in the outer coating layer is determined such that an adhesive property of the outer coating layer is 1 gf/mm or less.

17 Claims, 7 Drawing Sheets

U.S. PATENT DOCUMENTS

| | | | |
|---|---|---|---|
| 4,482,204 A | 11/1984 | Blyler et al. | |
| 4,715,679 A | 12/1987 | Bhagavatula | |
| 4,801,186 A | 1/1989 | Wagatsuma et al. | |
| 4,877,304 A | 10/1989 | Bhagavatula | |
| 5,259,060 A | 11/1993 | Edward et al. | |
| 5,261,016 A | 11/1993 | Poole | |
| 5,361,319 A | 11/1994 | Antos et al. | |
| 5,381,504 A | 1/1995 | Novack et al. | |
| 5,416,880 A | 5/1995 | Edwards et al. | |
| 5,448,674 A | 9/1995 | Vengsarkar et al. | |
| 5,555,340 A | 9/1996 | Onishi et al. | |
| 5,568,583 A | 10/1996 | Akasaka et al. | |
| 5,644,670 A | 7/1997 | Fukuda et al. | |
| 5,673,354 A | 9/1997 | Akasaka et al. | |
| 5,680,491 A | 10/1997 | Shigematsu et al. | |
| 5,684,909 A | 11/1997 | Liu | |
| 5,701,188 A | 12/1997 | Shigematsu et al. | |
| 5,740,297 A | 4/1998 | Onishi et al. | |
| 5,742,723 A | 4/1998 | Onishi et al. | |
| 5,781,673 A | 7/1998 | Reed et al. | |
| 5,799,123 A | 8/1998 | Oyobe et al. | |
| 5,802,234 A | 9/1998 | Vengsarkar et al. | |
| 5,802,235 A | 9/1998 | Akasaka | |
| 5,838,867 A | 11/1998 | Onishi et al. | |
| 5,887,093 A | 3/1999 | Hansen et al. | |
| 5,887,104 A | 3/1999 | Sugizaki et al. | |
| 5,933,561 A | 8/1999 | Sugizaki | |
| 5,995,694 A | 11/1999 | Akasaka et al. | |
| 5,999,679 A | 12/1999 | Antos et al. | |
| 6,009,221 A | 12/1999 | Tsuda | |
| 6,021,245 A | 2/2000 | Berger et al. | |
| 6,031,955 A | 2/2000 | Mukasa et al. | |
| 6,048,911 A | 4/2000 | Shustack et al. | |
| 6,055,081 A | 4/2000 | Koyano et al. | |
| 6,173,102 B1 | 1/2001 | Suzuki et al. | |
| 6,445,864 B2 | 9/2002 | Jiang et al. | |
| 6,744,959 B2 | 6/2004 | Takahashi | |
| 6,937,805 B2 * | 8/2005 | Aikawa et al. | 385/123 |
| 6,965,719 B2 * | 11/2005 | Aikawa et al. | 385/128 |
| 2001/0033724 A1 | 10/2001 | Kato et al. | |
| 2002/0018631 A1 | 2/2002 | Arai et al. | |
| 2003/0095769 A1 | 5/2003 | Aikawa et al. | |
| 2003/0133678 A1 | 7/2003 | Mukasa | |

FOREIGN PATENT DOCUMENTS

| | | |
|---|---|---|
| EP | 1 107 027 A1 | 7/2001 |
| JP | 56-149351 | 11/1981 |
| JP | 02-94229 | 7/1990 |
| JP | 04-006125 | 1/1992 |
| JP | 04-310547 | 11/1992 |
| JP | 04-342445 | 11/1992 |
| JP | 05-203847 | 8/1993 |
| JP | 08-036123 | 2/1996 |
| JP | 10-62301 | 3/1998 |
| JP | 10-115727 | 5/1998 |
| JP | 2001-296444 | 10/2001 |
| JP | 2002-182056 | 6/2002 |
| JP | 2002-183056 | 6/2002 |
| JP | 2003-241001 | 8/2003 |
| WO | WO 00/50935 | 8/2000 |
| WO | 00/70378 | 11/2000 |
| WO | 2000/070378 | 11/2000 |
| WO | WO 01/11402 A1 | 2/2001 |

OTHER PUBLICATIONS

Grüner-Nielsen, L., et al., "Design and manufacture of dispersion compensating fibre for simultaneous compensation of dispersion and dispersion slope," OFC IOOC '99 Technical Digest, Optical Fiber Communication Conference and the International Conference on Integrated Optics and Optical Fiber Communication, San Diego Convention Center, San Diego, California, Feb. 21-26, 1999, pp. 232-234.

Berkey, G.E., et al., "Negative Slope Dispersion Compensating Fibers," OFC IOOC '99 Technical Digest, Optical Fiber Communication Conference and the International Conference on Integrated Optics and Optical Fiber Communication, San Diego Convention Center, San Diego, California, Feb. 21-26, 1999, pp. 235-237.

Tsuritani, T., et al., "1Tbit/s (100x10.7Gbit/s) Transoceanic Transmission Using 30nm-Wide Broadband Optical Repeaters with Aeff-Enlarged Positive Dispersion Fibre and Slope-Compensating DCF," ECOC '99 Conference & Exhibition, 25th European Conference on Optical Communication, Sep. 26-30, 1999, Nice, France, pp. 38-39.

Yanada, E. et al., "Dual-band Hybrid Transmission Line Consisting of Pure Silica Core Fiber and Dispersion Compensating Fiber," OFC 2000 Technical Digest,Optical Fiber Communication Conference, Baltimore Convention Center, Baltimore, Maryland, Mar. 7-10, 2000, pp. 92-94.

Yanada, E., et al., "Perfectly dispersion slope compensated hybrid optical transmission line," Proceedings of the 2000 IEICE General Conference, The Institute of Electronics, Information and Communication Engineers, Hiroshima University, Higashi-Hiroshima, Mar. 28-31, 2000, pp. 217.

Suzuki, T., et al., "Large-effective-area dispersion compensating fibers for dispersion accommodation both in the C and L band," OECC 2000 Technical Digest, Fifth Optoelectronics and Communications Conference, Nippon Convention Center, Makuhari Messe, Chiba, Japan, Jul. 10-14, 2000, pp. 554-555.

Fujii, T., et al., "High Performance Dispersion Compensating Fiber Modules by 'Stress-Free Coil' Packing Technique," NFOEC National Fiber Optic Engineers Conference Technical Proceedings, 16th Annual Fiber Optic Engineers Conference, Colorado Convention Center, Denver, Colorado, Aug. 27-31, 2000, pp. 420-429.

Shimizu, S., et al., "Dispersion Compensating Fiber Module for L-band With Low Nonlinearity," Proceedings of the 2001 IEICE General Conference, The Institute of Electronics, Information and Communication Engineers, Ritsumeikan University, Kusatsu, Mar, 26-29, 2001, pp. 198.

Tarasiuk, B., et al., "Urethane-Acrylates as Main Components of Lacquers for Protective Coating of Some Materials," Mol. Cryst. And Liq. Cryst., vol. 354, Jun. 2000, pp. 49-53.

\* cited by examiner

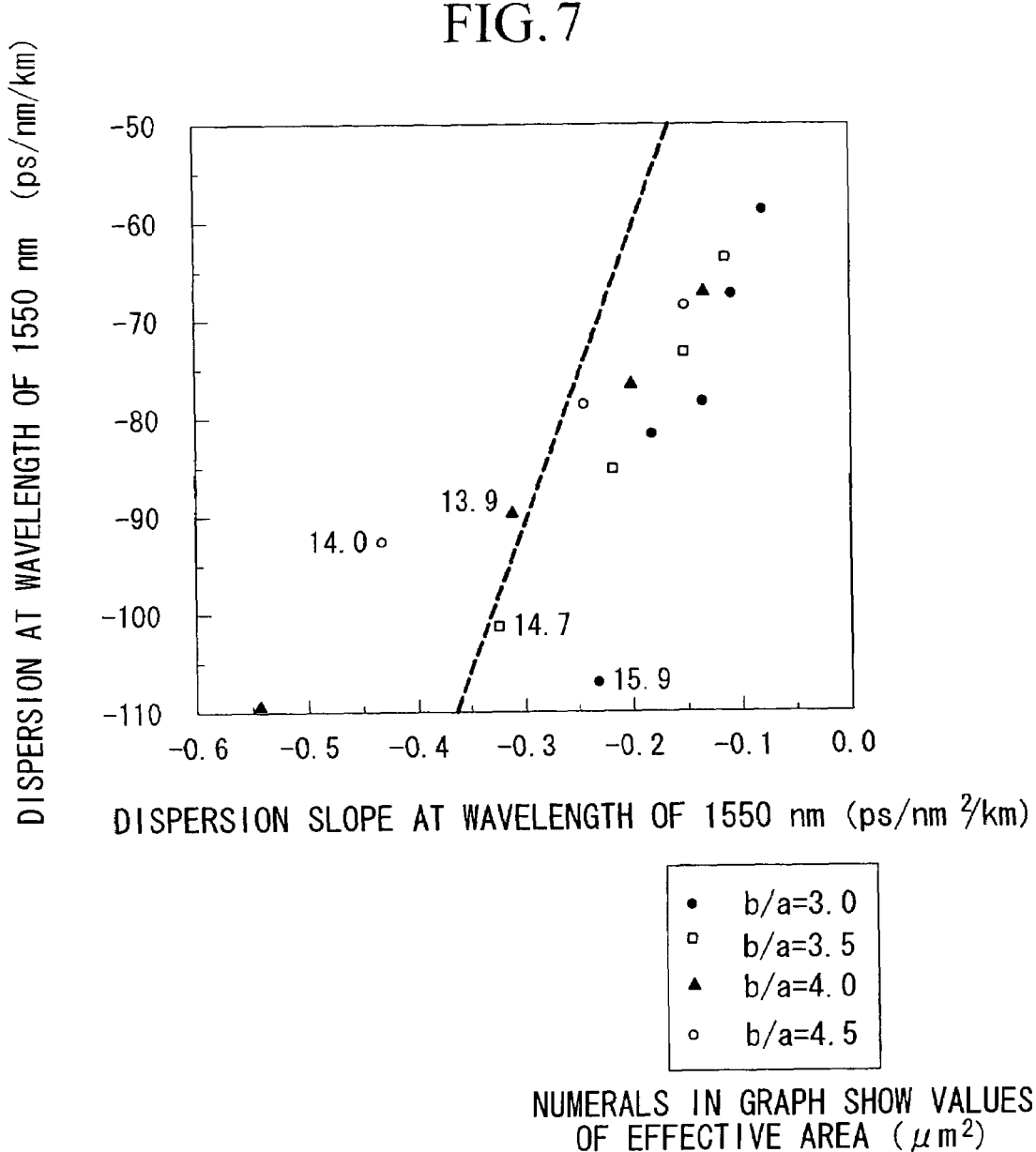

FIG. 8A
FIG. 8B
FIG. 8C
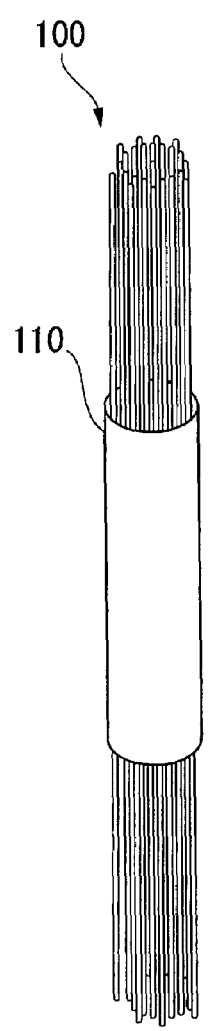
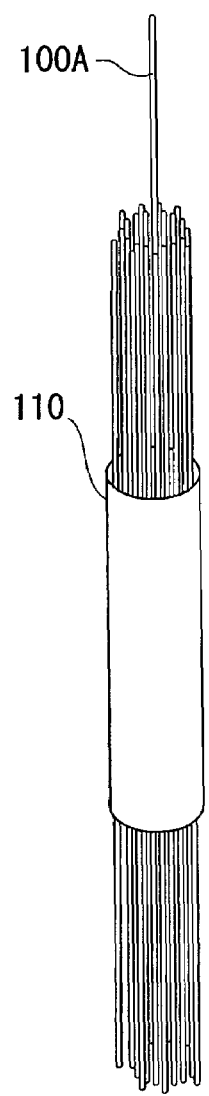
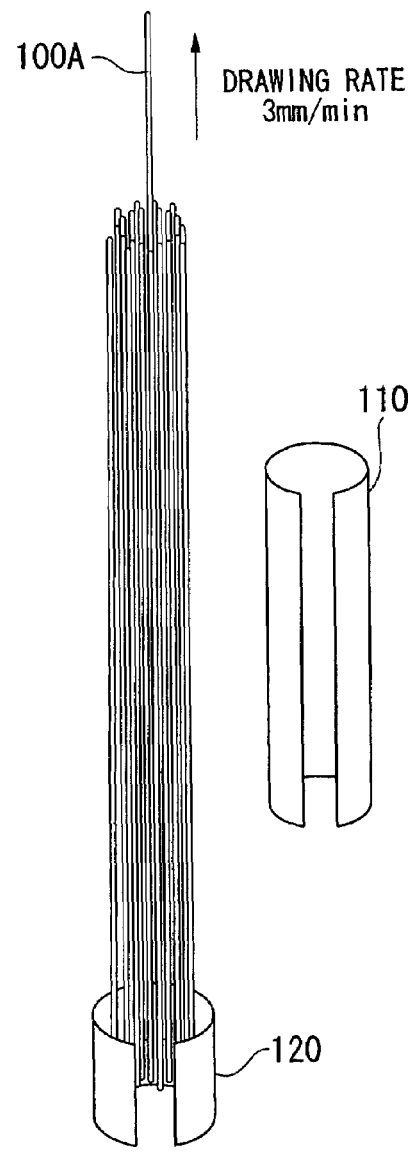

DISPERSION COMPENSATING OPTICAL FIBER AND DISPERSION COMPENSATING OPTICAL FIBER MODULE

CROSS REFERENCE TO RELATED APPLICATIONS

This is a Continuation-in-Part application of application Ser. No 10/104,916, filed Mar. 21, 2002 now U.S. Pat. No. 6,965,719, and claiming priority on Japanese Patent Application No. 2001-193546, filed Jun. 26, 2001, the contents of which are entirely incorporated herein by reference.

BACKGROUND OF THE INVENTION

1. Field of the Invention

The present invention relates to a dispersion compensating optical fiber and to a dispersion compensating optical fiber module. Specifically, the present invention relates to a dispersion compensating optical fiber compensating for chromatic dispersion and the dispersion slope caused by transmitting optical signals in an employed wavelength band selected from the wavelength region from 1.52 µm to 1.63 µm by means of a standard single mode optical fiber with a dispersion zero at 1.3 µm, and relates to a dispersion compensating optical fiber module including the dispersion compensating optical fiber.

The present invention also relates to a dispersion compensating optical fiber and to a dispersion compensating optical fiber module for compensating for chromatic dispersion and dispersion slope caused by transmitting optical signals in non-zero dispersion shifted optical fibers (hereinafter abbreviated as NZ-DSFs) having a chromatic dispersion of approximately a few ps/nm/km in the 1.55 µm band.

2. Description of Related Art

Systems including optical amplifiers such as very-long-distance non-repeating relays for wavelengths of 1.52 to 1.63 µm are already commercially available as erbium-doped optical fiber amplifiers and are in practical use. Furthermore, the development of wavelength division multiplexing transmission has rapidly progressed with the increase in transmission capacity. Wavelength division multiplexing transmission system is already commercially available in a number of transmission lines. It is anticipated that the expansion of the wavelength band and the increase in the number of times wavelengths are multiplexed will rapidly progress in the future.

In order to perform high-speed transmission, the chromatic dispersion in transmission lines of optical fibers are preferably as small as possible in the transmission band, but are not zero. Moreover, in order to perform wavelength division multiplexing in a transmission system, it is important that the ratio of dispersion change relative to wavelength change in the entire length of the transmission path (which is referred to as "dispersion slope", hereinafter) is small in order to decrease the difference in the dispersion between each wavelength in an employed wavelength band, in addition to decreasing amplification differences caused by the erbium-doped optical fiber amplifier in the employed wavelength band and decreasing the chromatic dispersion.

Moreover, recent long-distance systems require techniques for suppressing effects of nonlinearity which may cause deterioration, such as transmission characteristics, because the number of wavelengths multiplexed and the optical power propagating through the optical fiber rapidly increase.

The magnitude of the nonlinearity is expressed as $n_2/A_{eff}$, where $n_2$ represents the nonlinear refractive index for the optical fiber, and $A_{eff}$ represents the effective area of the optical fiber. In order to suppress the effects of the nonlinearity, $n_2$ is required to be small or $A_{eff}$ is required to be large. However, it is difficult to significantly decrease $n_2$ in an optical fiber composed of silica glass material, because $n_2$ is a constant value of a material for the optical fiber. Therefore, it is important to increase $A_{eff}$ in order to suppress the effect of nonlinearity.

Recently, single mode optical fiber networks for a wavelength of 1.3 µm are being used worldwide. When the transmission for a wavelength of 1.55 µm band is performed by using the optical fiber network, about +17 ps/nm/km of chromatic dispersion is caused. Therefore, when optical signals are transmitted through the optical fiber, the transmission characteristics are worsened by the chromatic dispersion.

A dispersion compensating optical fiber for compensating the chromatic dispersion has been developed and is commercially available. The dispersion compensating optical fiber has a large negative dispersion in the 1.55 µm wavelength band. By connecting the dispersion compensating optical fiber to a transmitting single mode optical fiber at a suitable length, accumulated positive dispersion caused by the transmitting single mode optical fiber can be compensated for, which actualizes high-speed communication.

Moreover, the wavelength division multiplexing system has recently progressed accompanying the increase in the transmission capacity. For example, in the case of compensating for the chromatic dispersion of the transmitting optical fiber for the wavelength of 1.3 µm by using a dispersion compensating optical fiber having a large negative chromatic dispersion and a positive dispersion slope, although the dispersion of one wavelength among wavelengths can be compensated for, the dispersions of other wavelengths are not sufficiently compensated for, and the transmission characteristics of the wavelengths far from the compensated wavelength are worsened.

Accordingly, a dispersion-slope-compensating and dispersion-compensating optical fiber having a W-type refractive index profile with a negative dispersion slope as shown in FIG. 6 (which is referred to as a "dispersion compensating optical fiber with a W-type profile") was developed. In FIG. 6, a center core portion 1, a side core portion 2, and a cladding portion 4 are shown. In the dispersion compensating optical fiber with the W-type profile, the dispersion slope can also be entirely compensated for by controlling the specific refractive index difference Δ1 of the center core portion 1 relative to the cladding portion 4, the specific refractive index difference Δ2 of the side core portion 2 relative to the cladding portion 4, and the ratio of the radius 1 of the center core portion 1 relative to the radius b of the side core portion 2.

The dispersion-slope-compensating and dispersion-compensating optical fiber can compensate for the chromatic dispersion and the dispersion slope by rendering it into a cable for a transmission line or by inserting it as a small module into the receiving side or the transmitting side of an existing transmission line.

However, a conventional dispersion compensating optical fiber has a structure in which the specific refractive index difference Δ1 of the center core portion increases and the specific refractive index difference Δ2 of the side core portion around the core portion decreases, and has a small core diameter, in order to increase the absolute value of the chromatic dispersion per unit length while having a refractive index distribution profile as shown in FIG. 6. FIG. 7 shows the relationship between the dispersion slope and the chromatic dispersion when the value of b/a is changed with setting Δ1 to 1.8% and Δ2 to −0.4%.

In FIG. 7, a dotted line shows 100% of the dispersion slope compensation ratio, which is the desirable value of the dispersion slope compensation ratio. The dispersion slope compensation ratio is calculated by dividing the ratio of the dispersion slope of a dispersion compensating optical fiber relative to the dispersion slope of a transmitting single mode optical fiber by the ratio of the dispersion value of the dispersion compensating optical fiber relative to the dispersion value of the transmitting single mode optical fiber. Moreover, values of effective areas ($A_{\textit{eff}}$) are also shown in FIG. 7. As shown in FIG. 7, although dispersion compensating optical fibers with the W-type profile can have desirable dispersion characteristics, the bending loss tends to increase and the effective areas tend to be small, which tends to cause nonlinear effects.

Although examples in which the dispersion slopes are compensated for by means of the dispersion compensating optical fibers each having a W-type profile are reported in TuG3 of OFC 2000 (Optical Fiber Communication Conference) and in C3-3-38 of the Institute of Electronics, Information and Communication Engineers in 2000, for example, effective areas ($A_{\textit{eff}}$) of both of the dispersion compensating optical fibers are 18.4 $\mu m^2$, which are not sufficiently large.

Moreover, in order to improve the bending loss and the dispersion slope characteristics, a dispersion-slope-compensating and dispersion-compensating optical fiber having segment-attached a W-type refractive index profile as shown in FIG. 1 has been developed. In FIG. 1, a center core portion 1, a core portion 2 disposed around the center core portion 1, a ring core portion disposed around the core portion 2, and a cladding portion 4 disposed around the ring core portion 3 are shown.

Although the present inventors reported, at 14C4-4 at the OECC 2000 (Optoelectronics and Communications Conference), one embodiment of this dispersion compensating optical fiber compensating the dispersion slope, which has an effective area ($A_{\textit{eff}}$) enlarged to 21.0 $\mu m^2$, the absolute value of the chromatic dispersion is 61.5 ps/nm/km, which is small. Therefore, it is required to increase the length of the fiber for producing a dispersion compensating optical fiber module by winding the fiber into a small coil. However, it is difficult to wind the fiber into the small coil and to miniaturize the module. When the length of the fiber used becomes longer, the cost required for producing the module increases.

The present inventors, Shimizu et al., reported, at C3-3-33 of the Institute of Electronics, Information and Communication Engineers in 2001, a dispersion compensating optical fiber module having low nonlinear properties, low losses, and superior dispersion slope compensating functions, which are not provided conventionally.

However, the dispersion compensating optical fiber has characteristics in which the microbending loss increases as the dispersion slope compensation ratio increases from low values to 100%. Moreover, the microbending loss tends to be caused by decreasing the dispersion values or increasing the effective area. In order to prevent the microbending loss, a method in which an optical fiber is fixed by a resin without using a reel (NFOEC (National Fiber Optic Engineers Conference) 2000, pp. 420 to 429).

An optical fiber generally includes a coating layer which is made from at least one ultraviolet light curable resin such as ultraviolet light curable urethane acrylate resin, and which is formed onto the surface of glass. Since the surface of the coating layer has a slight adhesive property (which is referred to as "surface tackiness"), which causes adhesion of portions of the optical fiber to other portions thereof, a dispersion compensating optical fiber module produced by winding a long optical fiber into a small coil has problems in that temperature characteristics are increased.

The adhesive property (surface tackiness) is defined as the degree to which optical fibers stick together. A specific example of a method for measuring the adhesive property is disclosed in Japanese Patent Application, First Publication No. Hei 10-62301, in which the tensile change of an optical fiber which is wound many times around a delivery roll so as to be overlapped is measured by rewinding the optical fiber with a constant tension.

Specifically, various situations are anticipated for environments in which a dispersion compensating optical fiber module is employed, and suitable operations of the dispersion compensating optical fiber module may be required from the low temperature region (down to −40° C.) to the high temperature region (up to +80° C.). A dispersion compensating optical fiber used for the dispersion compensating optical fiber module has a short fiber length, a large absolute value of the chromatic dispersion, and a large effective area, which enable miniaturization of the module. Therefore, the microbending loss of the dispersion compensating optical fiber is larger than those of conventional dispersion compensating optical fibers. As a result, problems are caused in which the loss at the low temperature region is increased by the microbending loss and the surface tackiness, when the module is produced by using the dispersion compensating optical fiber. Although the aforementioned problems are caused depending on characteristics of the dispersion compensating optical fiber, the problems are significant when the module is formed into a small coil in which portions of the optical fibers are adhered to other portions thereof.

SUMMARY OF THE INVENTION

The present invention has been accomplished in view of the aforementioned circumstance, and aims at providing a dispersion compensating optical fiber module in which the loss change is suppressed over a broad temperature range even if the dispersion compensating optical fiber is wound around a small reel.

The present invention provides a dispersion compensating optical fiber including: an uncovered dispersion compensating optical fiber containing a core and a cladding; and a resin coating which is disposed around the uncovered dispersion compensating optical fiber and which has an adhesive property of 10 gf/mm or less.

The resin coating may have an adhesive property of 1 gf/mm or less. The outer diameter of the uncovered dispersion compensating optical fiber may be in a range from 90 to 125 $\mu m$, and the outer diameter of the dispersion compensating optical fiber may be in a range from 180 to 250 $\mu m$.

The resin coating may include an outer coating layer. The outer coating layer may contain silicone in an amount of 1% by weight or more. The outer coating layer may include an ultraviolet light curable urethane acrylate resin containing a coloring agent. The outer coating layer may be formed to have a thickness of 3 $\mu m$ or more. The outer coating layer may be formed by a step different from an optical fiber drawing step.

The resin coating may further include a single or double coating layer formed between the cladding and the outer coating layer. The outer diameter of the uncovered dispersion compensating optical fiber may be in a range from 90 to 125 $\mu m$, and the diameter coated by the single or double coating layer may be in a range from 180 to 250 $\mu m$.

The optical fiber may have a bending loss of 20 dB/m or less at the bending diameter of 20 mm in an employed wavelength band selected from the range of 1.52 to 1.63 $\mu m$.

The dispersion compensating optical fiber may have an effective area of 19 μm² or more, a chromatic dispersion of −70 ps/nm/km or less, and a cut-off wavelength which is capable of substantially single mode propagation, in an employed wavelength band selected from the range of 1.52 to 1.63 μm, and the compensation ratio of the dispersion slope may be 80 to 120% when the chromatic dispersion of a single mode optical fiber having a zero dispersion wavelength shorter than the employed wavelength band is compensated for by using the dispersion compensating optical fiber having a length enough to compensate for the chromatic dispersion of the single mode optical fiber to zero or nearly zero.

The uncovered dispersion compensating optical fiber may have a refractive index profile including a center core portion; a core portion provided around the outer periphery of the center core portion and having a lower refractive index than that of the center core portion; a ring core portion provided around the outer periphery of the core portion and having a lower refractive index than that of the center core portion and a higher refractive index than that of the core portion; and a cladding portion provided around the periphery of the ring core portion and having a higher refractive index than the core portion and a lower refractive index than the ring core portion; in which the radius of the ring core portion is 6 to 10 μm; the ratio of the radius of the core portion relative to the radius of the center core portion is 2.5 to 4.0; and the ratio of the radius of the ring core portion relative to the radius of the core portion is 1.1 to 2.0; and when the refractive index of the cladding portion is taken as the standard, the relative refractive index of the center core portion is 1.2 to 1.7%; the relative refractive index of the core portion is −0.20 to −0.45%; and the relative refractive index of the ring core portion is 0.2 to 1.1%.

Moreover, the present invention provides a dispersion compensating optical fiber including: an uncovered dispersion compensating optical fiber; a double-layered resin coating disposed around the uncovered dispersion compensating optical fiber; and an outer coating layer having a thickness of 3 to 7 μm, containing silicone in an amount of 1 to 5% by weight, and disposed around the double-layered resin coating, wherein the outer diameter of the uncovered dispersion compensating optical fiber is in a range from 90 to 125 μm, an outer diameter of the dispersion compensating optical fiber is in a range from 180 to 250 μm, wherein the uncovered dispersion compensating optical fiber includes: a cladding; a central core region having a higher refractive index than that of the cladding; a depressed core region which is located around the central core region, and which has a lower refractive index than that of the cladding; and a ring core region which is located around the depressed core region and inside the cladding, and which has a higher refractive index than that of the cladding, wherein the radius of the ring core region is set in a range from 6.5 μm to 9.5 μm, the radius ratio of the depressed core region relative to the central core region is set in a range from 2.0 to 4.0, and the radius ratio of the ring core region relative to the depressed core region is set in a range from 1.1 to 2.0, wherein the relative refractive index difference of the central core region relative to the cladding is set in a range from +1.00% to +1.90%, the relative refractive index difference of the depressed core region relative to the cladding is set in a range from −0.60% to −1.00%, and the relative refractive index difference of the ring core region relative to the cladding is set in a range from +0.20% to +1.00%, and wherein at at least one wavelength selected from the range from 1.53 μm to 1.63 μm, chromatic dispersion of the dispersion compensating fiber is in a range from −50 ps/nm/km to −150 ps/nm/km, the dispersion slope is in a range from −0.25 ps/nm²/km to −3.0 ps/nm²/km, the ratio of the dispersion slope relative to the chromatic dispersion is in a range from 0.005 nm$^{-1}$ to 0.020 nm$^{-1}$, and the dispersion compensating fiber has a cut-off wavelength which substantially enables single mode transmission.

In the above dispersion compensating optical fiber, wherein the amount of silicone contained in the outer coating layer may be determined such that an adhesive property, which is defined by a drawing force required to longitudinally draw out a resin-coated optical fiber from a bundle of resin-coated optical fibers, of the outer coating layer is 1 gf/mm or less.

In the above dispersion compensating optical fiber, the transmission loss may be not more than 0.5 dB/km, and the bending loss at a diameter of 20 mm at the longest wavelength in the wavelength band selected from 1.53 μm to 1.63 μm may be not more than 100 dB/m.

In the above dispersion compensating optical fiber, the transmission loss may be not more than 0.5 dB/km, and the bending loss at a diameter of 20 mm at the longest wavelength in the wavelength band selected from 1.53 μm to 1.63 μm may be not more than 20 dB/m.

The above dispersion compensating optical fiber may further include a layer which is located between the ring core region and the cladding, and which has a lower refractive index than that of the cladding.

Furthermore, the present invention provides a dispersion compensating optical fiber including: an uncovered dispersion compensating optical fiber; a double-layered resin coating disposed around the uncovered dispersion compensating optical fiber; and an outer coating layer having a thickness of 3 to 7 μm, containing silicone in an amount of 1 to 5% by weight, and disposed around the double-layered resin coating, wherein the outer diameter of the uncovered dispersion compensating optical fiber is in a range from 90 to 125 μm, an outer diameter of the dispersion compensating optical fiber is in a range from 180 to 250 μm, wherein the uncovered dispersion compensating optical fiber includes: a cladding; a central core region having a higher refractive index than that of the cladding; a depressed core region which is located around the central core region, and which has a lower refractive index than that of the cladding; and a ring core region which is located around the depressed core region and inside the cladding, and which has a higher refractive index than that of the cladding, wherein the radius of the ring core region is set in a range from 6.7 μm to 10.7 μm, the radius ratio of the depressed core region relative to the central core region is set in a range from 2.0 to 3.0, and the radius ratio of the ring core region relative to the depressed core region is set in a range from 1.3 to 2.0, wherein the relative refractive index difference of the central core region relative to the cladding is set in a range from +1.00% to +1.80%, the relative refractive index difference of the depressed core region relative to the cladding is set in a range from −1.20% to −1.50%, and the relative refractive index difference of the ring core region relative to the cladding is set in a range from +0.20% to +0.50%, and wherein at at least one wavelength selected from the range from 1.53 μm to 1.57 μm, chromatic dispersion of the dispersion compensating fiber is in a range from −20 ps/nm/km to −140 ps/nm/km, the ratio of the dispersion slope relative to the chromatic dispersion is in a range from 0.016 nm$^{-1}$ to 0.024 nm$^{-}$, and the dispersion compensating fiber has a cut-off wavelength which substantially enables single mode transmission.

Moreover, the present invention provides a dispersion compensating optical fiber module including: a reel having a minimum diameter of 200 mm or less; and the aforementioned dispersion compensating optical fiber wound around the reel at a winding tension of 20 to 70 gf. The winding tension may more preferably be set in a range of 30 to 50 gf.

BRIEF DESCRIPTION OF THE DRAWINGS

FIG. 7 shows the relationship between the chromatic dispersion and the dispersion slope of a conventional dispersion compensating optical fiber.

FIGS. 8A to 8C show the steps in a method for measuring an adhesive property of a resin-coated optical fiber.

DETAILED DESCRIPTION OF THE INVENTION

In the following, although preferred embodiments of the present invention will be explained, the present invention is not limited by the preferred embodiments, and components and concepts of the embodiments may be freely combined.

Figure 1:
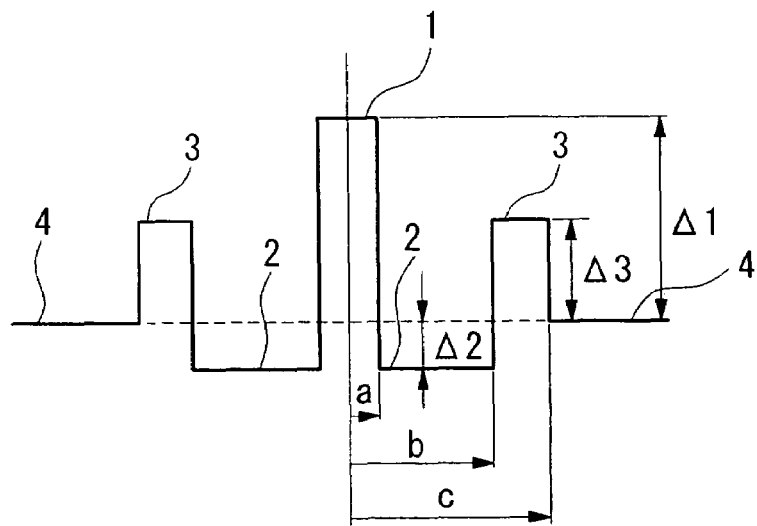
FIG. 1 shows a refractive index profile of a dispersion compensating optical fiber according to one embodiment of the present invention.

A dispersion compensating optical fiber according to a first embodiment of the present invention includes an uncovered dispersion compensating optical fiber and a resin coating. In FIG. 1, the refractive index profile of the uncovered dispersion compensating optical fiber is shown. As shown in FIG. 1, the uncovered dispersion compensating optical fiber includes a center core portion 1, a core portion 2 provided around the outer periphery of the center core portion 1, a ring core portion 3 provided around the outer periphery of the core portion 2, and a cladding portion 4 provided around the periphery of the ring core portion 3.

The center core portion 1 has a refractive index higher than that of the cladding portion 4. The core portion 2 has a refractive index lower than that of the cladding portion 4. The ring core portion 3 has a refractive index higher than that of the cladding portion 4.

As shown in FIG. 1, when the radius of the center core portion 1 is represented as a, the radius of the core portion 2 is represented as b, and the radius of the ring core portion 3 is represented as c, the dispersion compensating optical fiber is formed so that the ratio b/a is in the range from 2.5 to 4, the ratio c/b is in the range from 1.1 to 2.0, and the radius c is in the range from 6 to 10 µm.

When the relative refractive index differences for the central core portion 1 is represented as Δ1, the relative refractive index differences for the core portion 2 is represented as Δ2, and the relative refractive index differences for the ring core portion 3 is represented as Δ3, where the refractive index of the cladding portion 4 is taken as the standard, Δ1 is 1.2 to 1.7%, Δ2 is −0.20 to −0.45%, and Δ3 is 0.2 to 1.1%.

The dispersion compensating optical fiber has an effective area of 19 µm$^2$ or more, a chromatic dispersion of −70 ps/nm/km or less, and a cut-off wavelength which is capable of substantially single mode propagation, in an employed wavelength band selected from the range of 1.52 to 1.63 µm. The compensation ratio of the dispersion slope is 80 to 120% when the chromatic dispersion of a single mode optical fiber having a zero dispersion wavelength shorter than the employed wavelength band is compensated for by using the dispersion compensating optical fiber having a length sufficient to compensate for the chromatic dispersion of the single mode optical fiber to zero, or nearly zero.

The dispersion compensating optical fiber includes the uncovered dispersion compensating optical fiber having an outer diameter of 90 to 125 µm and the resin coating formed around the uncovered dispersion compensating optical fiber and having an adhesive property of 10 gf/mm or less, preferably 1 gf/mm or less. When the adhesive property of the dispersion compensating optical fiber is more than 10 gf/mm, since portions of the dispersion compensating optical fiber tend to adhere to other portions thereof by winding the dispersion compensating optical fiber into a coil in accordance with the temperature change, the loss change tends to increase.

The adhesive property is measured by the following method. First, the optical fiber is wound on a winding roll a number of times, and is introduced into a transmitting side dancer roll. Then, it is introduced into a receiving roll through a first fixed roll, a moving roll and a second fixed roll, and is set to a tension pickup between the moving roll and the second fixed roll. The optical fiber passed through the receiving roll is mounted on a winding roll through a winding side dancer roll similar to the transmitting side dancer roll. Then, the winding roll is rotated to impart a fixed tension to the optical fiber. The tension pickup detects the moving quantity of a detecting roll by the tension of the optical fiber to detect the tension, and displays and records it on a monitor. In this case, since the tension change added to the optical fiber becomes a value according to the surface tackiness, the surface tackiness of the optical fiber can be easily and quantitatively measured and evaluated.

The adhesive property (surface tackiness) can also be measured by bundling short-cut resin-coated optical fibers (e.g., 20 resin-coated optical fibers) using a heat-shrinkable tube, and measuring a drawing force required to draw out one of the short-cut resin-coated optical fibers. More specific steps will be explained below with reference to FIGS. 8A to 8C.

The method includes the steps of:

(1) preparing 20 short-cut resin-coated optical fibers 100 by cutting a resin-coated optical fiber at a length of 80 mm and a heat-shrinkable tube 110 in an un-shrunk state having an outer diameter of approximately 16 mm, an inner diameter of approximately 13 mm, and a length of 40 mm (it is preferable to select a heat-shrinkable tube that is sufficiently soft to enable easy cut after shrinkage);

(2) inserting the 20 short-cut resin-coated optical fibers 100 into the heat-shrinkable tube 110 as shown in FIG. 8A;

(3) drawing out one (100A) of the short-cut resin-coated optical fibers 100, which is located at a substantially center position, by 20 mm as shown in FIG. 8B;

(4) placing the short-cut resin-coated optical fibers 100 and the heat-shrinkable tube 110 under a temperature of 150° C. for 5 minutes so that the heat-shrinkable tube 110 shrinks;

(5) cutting the heat-shrinkable tube 110 using a blade or the like with care of neither cutting nor pressing the short-cut resin-coated optical fibers 100;
(6) bundling and fixing ends of the short-cut resin-coated optical fibers using a tape 120 or the like;
(7) further drawing the one (100A) of the short-cut resin-coated optical fibers 100 at a drawing rate of 3 mm/min while measuring a drawing force;
(8) reading out a maximum (peak) drawing force in a unit of gf; and
(9) obtaining the adhesive property by dividing the maximum drawing force expressed in a unit of gf by the initial contact length of 20 mm.

Accordingly, the adhesive property is expressed in a unit of gf/mm.

The resin coating includes a single or double coating layer and an outer coating layer disposed around the single or double coating layer. The diameter coated by the single or double coating layer is in a range from 180 to 250 µm. The outer coating layer has a thickness of 3 µm or more, and preferably 3 to 7 µm. The resin coating preferably contains at least one ultraviolet light curable resin such as ultraviolet light curable urethane acrylate resin. The outer coating layer may further contain silicone in an amount of 1% by weight or more, preferably 1 to 5% by weight, more preferably 2 to 3% by weight, relative to the total weight of the outer coating layer. By adding silicone into the outer coating layer in an amount of 1% by weight or more, the value of the adhesive property can be further reduced.

The dispersion compensating optical fiber can be produced by drawing an optical fiber preform (an uncovered dispersion compensating optical fiber) together with a resin composition containing silicone and the ultraviolet light curable resin. The optical fiber preform can be produced by a VAD method, an MCVD method, a PCVD method, or the like. The optical fiber drawing step for forming around the uncovered dispersion compensating optical fiber the resin coating having an adhesive property of 10 gf/mm or less is preferably carried out under the conditions in which the resin composition is applied onto the uncovered dispersion compensating optical fiber to have a thickness of 3 µm or more, and in which the atmospheric oxygen concentration during curing of the ultraviolet light curable resins is set to 2% or less, more preferably 0%. Moreover, the drawing speed is preferably set to 300 to 1,000 m/min, more preferably 300 to 600 m/min, so as to prevent winding disarrangement.

Next, a dispersion compensating optical fiber according to a second embodiment of the present invention will be explained.

In the dispersion compensating optical fiber of this embodiment, the uncovered dispersion compensating optical fiber disclosed in the first embodiment is coated by a resin coating including an outer coating layer formed by an ultraviolet light curable urethane acrylate resin including silicone and a coloring agent. Preferably, the content of silicone in the ultraviolet light curable urethane acrylate resin is 1 to 5% by weight, and more preferably 2 to 3% by weight, relative to the total weight of the ultraviolet light curable urethane acrylate resin. The diameter coated by the resin coating is in a range from 180 to 250 µm. The adhesive property of the dispersion compensating optical fiber is 1 gf/mm or less. The ultraviolet light curable resin containing a coloring agent may be a UV curable ink or the like. Instead of the coloring agent, other materials which can decrease the adhesive property of the resin coating can be mixed with the ultraviolet light curable resin.

The resin coating is formed by a step different from an optical fiber drawing step. The step of forming the resin coating is carried out under the conditions in which the atmospheric oxygen concentration during curing of the ultraviolet light curable urethane acrylate resin is set to 2% or less, more preferably 0%.

The dispersion compensating optical fiber has a bending loss of 20 dB/m or less at a bending diameter of 20 mm in an employed wavelength band selected from the range of 1.52 to 1.63 µm.

Next, one embodiment of a dispersion compensating optical fiber module according to the present invention will be explained.

The dispersion compensating optical fiber module is produced by winding the dispersion compensating optical fiber into a coil to suppress the loss change caused by the temperature change. The dispersion compensating optical fiber is wound by the winding tension of 20 to 70 gf, more preferably 30 to 50 gf, around a reel having a minimum diameter of 200 mm or less.

The aforementioned dispersion compensating optical fiber module is used by being disposed between a light source and a transmitting single mode optical fiber, or disposed to the side of the transmitting single mode optical fiber at which the optical signal is emitted.

Since the dispersion compensating optical fiber has a low adhesive property which can prevent portions of the chromatic dispersion compensating optical fiber from adhering to other portions thereof when the chromatic dispersion compensating optical fiber is wound into a small coil, the chromatic dispersion compensating optical fiber module has a low loss change in accordance with the temperature change over a broad temperature range. Therefore, the dispersion compensating optical fiber module can have a low loss and can be miniaturized.

EXAMPLES

In the following, specific examples will be explained.

Example 1

Five dispersion compensating optical fiber preforms were produced by an MCVD method or a PCVD method. Then, dispersion compensating optical fibers (A to E) were produced by drawing the dispersion compensating optical fiber preforms together with an ultraviolet light curable resin. The drawing step of each of the dispersion compensating optical fiber preforms was carried out while controlling drawing conditions so that the produced resin coating had an adhesive property of 5 to 6 gf/mm. Specifically, the atmospheric oxygen concentration during curing of the ultraviolet light curable resin was set to 2% or less, and the drawing speed was set to be 300 m/min so as to prevent winding irregularities.

Each of the dispersion compensating optical fibers (A to E) has a profile as shown in FIG. 1. The specific refractive index difference Δ1 of the center core portion 1, the specific refractive index difference Δ2 of the core portion 2, the specific refractive index difference Δ3 of the ring core portion 3, the ratio b/a of the core radius relative to the center core radius, the ratio c/b of the ring core radius relative to the core radius, and other optical properties, of each of the uncovered dispersion compensating optical fibers (A to E) are shown in TABLE 1. As shown in TABLE 1, each of the dispersion compensating optical fibers has a low transmission loss in a range from 0.25 to 0.32 dB/km and has a large effective area $A_{eff}$ of 20µ µm$^2$ or more.

TABLE 1

| No. | Δ1 (%) | Δ2 (%) | Δ3 (%) | b/a | c/b | core radius (μm) | Wavelength (μm) | $A_{eff}$ (μm²) | Transmission loss (dB/km) | wavelength dispersion (ps/nm/km) | dispersion slope (ps/nm²/km) | bending loss (dB/m) 2R = 20 mm |
|---|---|---|---|---|---|---|---|---|---|---|---|---|
| A | 1.65 | −0.31 | 0.50 | 3.3 | 1.23 | 7.5 | 1.55 | 21.7 | 0.31 | −84.2 | −0.27 | 2.2 |
| B | 1.70 | −0.32 | 0.50 | 3.4 | 1.23 | 7.5 | 1.55 | 20.7 | 0.32 | −90.0 | −0.28 | 1.3 |
| C | 1.36 | −0.26 | 0.22 | 3.4 | 1.77 | 8.9 | 1.55 | 21.4 | 0.29 | −82.0 | −0.24 | 7.5 |
| D | 1.30 | −0.44 | 0.96 | 3.2 | 1.20 | 6.2 | 1.55 | 20.5 | 0.28 | −80.2 | −0.24 | 3.9 |
| E | 1.30 | −0.34 | 1.02 | 3.6 | 1.20 | 6.7 | 1.55 | 21.6 | 0.30 | −80.0 | −0.24 | 4.1 |

By using the dispersion compensating optical fibers A and B shown in TABLE 1, three dispersion compensating optical fiber modules (A to C) each of which has a dispersion compensation value different from the others were produced. Characteristics of the dispersion compensating optical fiber modules are shown in TABLE 2. As shown in TABLE 2, results of the characteristics required for the dispersion compensating optical fiber modules, such as dispersion slope compensation ratio, insertion loss, PMD, and the like are satisfactory.

TABLE 2

| No. | insertion loss (dB) | dispersion value (ps/nm) | dispersion slope (ps/nm²) | dispersion slope compensation ratio (%) | $A_{eff}$ (μm²) | PMD at wavelength band of 1550 nm (ps) |
|---|---|---|---|---|---|---|
| module A | 2.08 | −340 | −1.09 | 92 | 21.7 | 0.2 |
| module B | 3.36 | −680 | −2.18 | 92 | 21.7 | 0.3 |
| module C | 5.63 | −1360 | −4.23 | 89 | 20.7 | 0.4 |

(wavelength: 1550 nm)

It is possible to increase transmission capacity and to increase transmission length by inserting the dispersion compensating optical fiber module and an amplifier module into the terminal of a transmission line of a conventional single mode optical fiber. Moreover, it is possible to miniaturize the module by using the dispersion compensating optical fiber having a low bending loss and a large absolute value of the chromatic dispersion.

Figure 2:
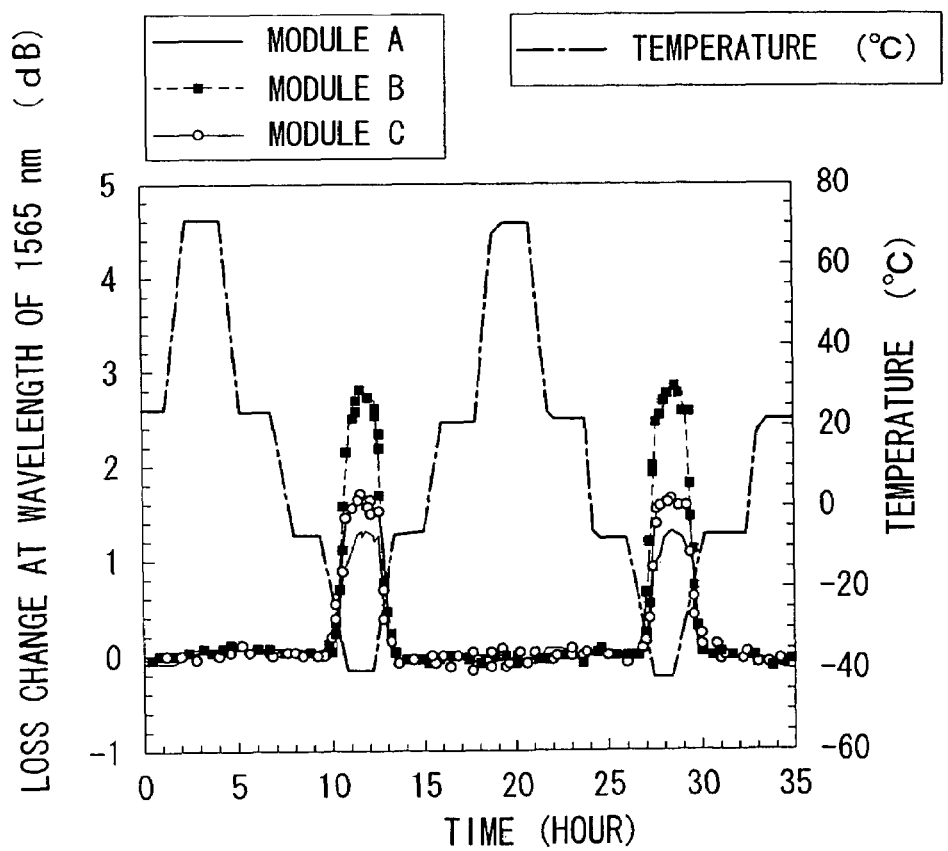
FIG. 2 shows the relationships between the loss change and the temperature change of dispersion compensating optical fiber modules in examples according the present invention.

Moreover, temperature characteristics of the insertion loss of the dispersion compensating optical fiber modules are shown in FIG. 2. As shown in FIG. 2, although the loss increase is approximately 2 dB at the low temperature region near −40° C., the loss increase is not recognized at other regions except the low temperature region near −40° C. Therefore, the dispersion compensating optical fiber modules can be satisfactorily used under normal conditions, because the dispersion compensating optical fiber modules are rarely used in continuous operations at −40° C.

Example 2

Five dispersion compensating optical fiber preforms were produced by an MCVD method or a PCVD method. Then, dispersion compensating optical fibers each of which had the same profile as shown in FIG. 1 were produced by drawing the dispersion compensating optical fiber preforms with an ultraviolet light curable resin to form a double coating layer, and then by coating a resin composition including silicone and an ultraviolet light curable urethane acrylate resin containing a coloring agent to form an outer coating layer around the double coating layer, while controlling coating conditions so that the produced resin had an adhesive property of 1 gf/mm or less. Specifically, the resin composition was used to form the outer coating layer having a thickness of 3 μm or more and the atmospheric oxygen concentration during curing the resin composition was set to 2% or less.

Each of the produced dispersion compensating optical fibers includes an uncovered dispersion compensating optical fiber having an outer diameter of 125 μm, the double coating layer by which the coated diameter was 230 μm, and the outer coating layer by which the coated diameter was 240 μm. That is, the thickness of the outer diameter was 5 μm.

Each of the produced dispersion compensating optical fibers has a low transmission loss in a range from 0.25 to 0.32 dB/km and has a large effective area ($A_{eff}$) of 20 μm² or more.

By using the dispersion compensating optical fibers each having the same profile as that of the aforementioned dispersion compensating optical fiber A or B, three dispersion compensating optical fiber modules (D to F), each of which has a dispersion compensation value different from the others, were produced. Characteristics of the dispersion compensating optical fiber modules are shown in TABLE 3. As shown in TABLE 3, results of the characteristics required for the dispersion compensating optical fiber modules, such as dispersion slope compensation ratio, insertion loss, PMD, and the like are satisfactory.

TABLE 3

| No. | insertion loss (dB) | dispersion value (ps/nm) | dispersion slope (ps/nm$^2$) | dispersion slope compensation ratio (%) | $A_{eff}$ (μm$^2$) | PMD at wavelength band of 1550 nm (ps) |
|---|---|---|---|---|---|---|
| module D | 2.08 | −340 | −1.09 | 92 | 21.7 | 0.2 |
| module E | 3.36 | −680 | −2.18 | 92 | 21.7 | 0.3 |
| module F | 5.63 | −1360 | −4.23 | 89 | 20.7 | 0.4 |

(wavelength: 1550 nm)

Figure 3:
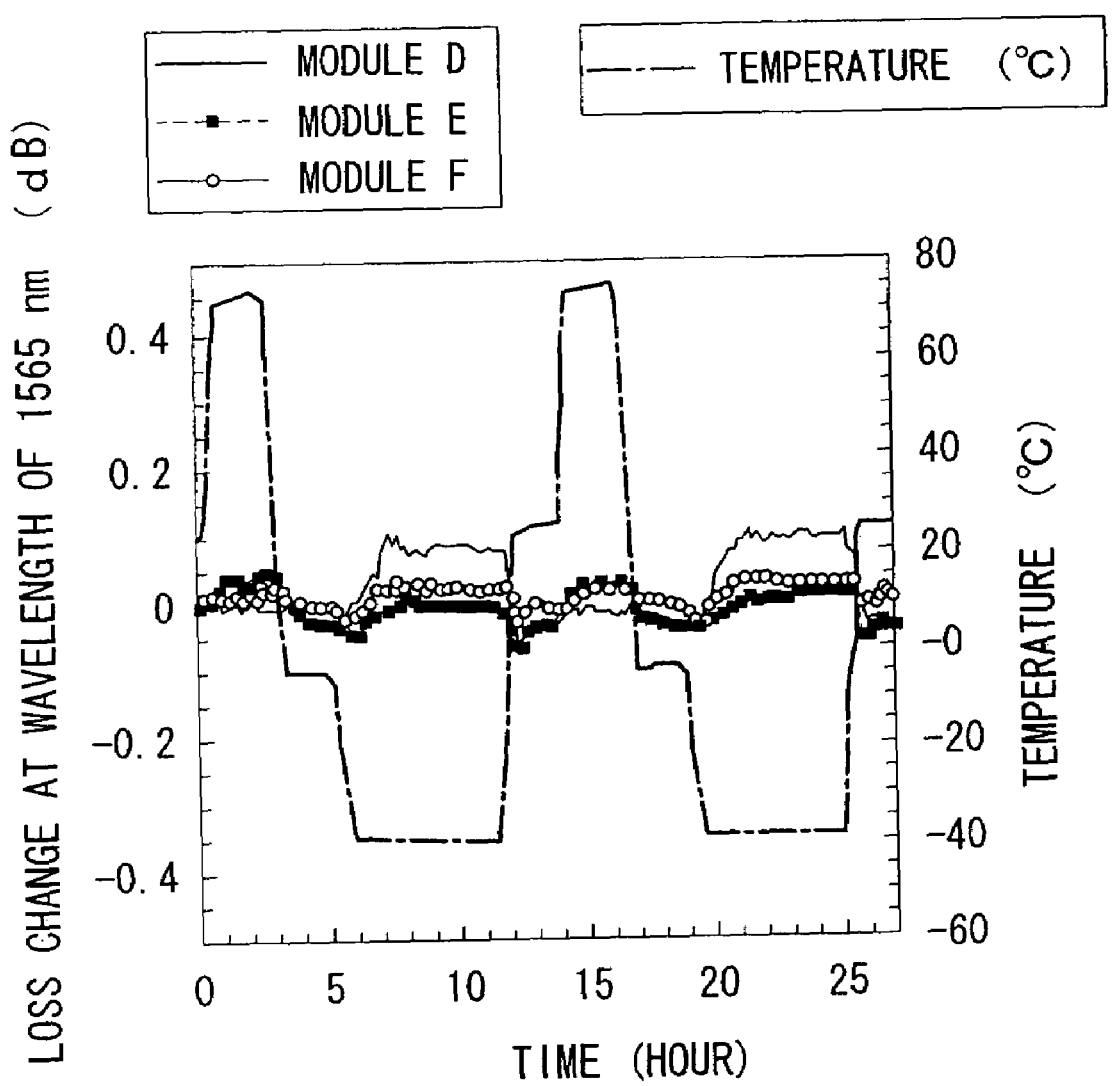
FIG. 3 shows the relationships between the loss change and the temperature change of dispersion compensating optical fiber modules in examples according to the present invention.

Moreover, temperature characteristics of the insertion loss of the dispersion compensating optical fiber modules are shown in FIG. 3. As shown in FIG. 3, the maximum value of the loss change was 0.1 dB or less in the temperature range of −40 to +75° C., and the temperature characteristics were improved. It is supposed that the temperature characteristics were improved in the low temperature range because the dispersion compensating optical fiber modules were produced from the dispersion compensating optical fiber of which the resin coating had an adhesive property of 1 gf/mm or less.

Example 3

Two dispersion compensating optical fiber preforms were produced by an MCVD method or a PCVD method. Then, dispersion compensating optical fibers (F and G) were produced by drawing the dispersion compensating optical fiber preforms with ultraviolet light curable resin to form a double coating layer, and then by coating a resin composition including silicone and an ultraviolet light curable urethane acrylate resin containing a coloring agent to form an outer coating layer around the double coating layer, while controlling coating conditions so that the produced resin had an adhesive property of 1 gf/mm or less.

Each of the dispersion compensating optical fibers (F and G) has a profile as shown in FIG. 1 and properties shown in TABLE 4. Each of the produced dispersion compensating optical fibers includes an uncovered dispersion compensating optical fiber having an outer diameter of 125 μm, the double coating layer by which coated diameter was 230 μm, and the outer coating layer by which coated diameter was 240 μm. That is, the outer coating layer had a thickness of 5 μm.

Each of the produced dispersion compensating optical fibers can compensate, in an employed wavelength band selected from a range of 1565 nm to 1625 nm, a single mode optical fiber having a chromatic dispersion of +19.0 ps/nm/km and a chromatic dispersion slope of +0.054 ps/nm$^2$/km, at a wavelength of 1590 nm.

Each of the produced dispersion compensating optical fibers has a low transmission loss in a range from 0.25 to 0.32 dB/km and has a large effective area ($A_{eff}$) of 20 μm$^2$ or more.

TABLE 4

| No. | Δ1 (%) | Δ2 (%) | Δ3 (%) | b/a | c/b | core radius (μm) | $A_{eff}$ (μm$^2$) | Transmission loss (dB/km) | Wavelength dispersion (ps/nm/km) | dispersion slope (ps/nm$^2$/km) | bending loss (dB/m) 2R = 20 mm |
|---|---|---|---|---|---|---|---|---|---|---|---|
| F | 1.65 | −0.31 | 0.50 | 3.3 | 1.23 | 8.6 | 24.7 | 0.30 | −84.2 | −0.21 | 2.2 |
| G | 1.70 | −0.32 | 0.50 | 3.4 | 1.23 | 9.4 | 23.7 | 0.32 | −90.0 | −0.28 | 1.3 |

(wavelength: 1590 nm)

By using the dispersion compensating optical fibers F and G shown in TABLE 4, three dispersion compensating optical fiber modules (G to I) each of which has a dispersion compensation value different from the others were produced. Characteristics of the dispersion compensating optical fiber modules are shown in TABLE 5. As shown in TABLE 5, results of the characteristics required for the dispersion compensating optical fiber modules, such as dispersion slope compensation ratio, insertion loss, PMD, and the like are satisfactory.

TABLE 5

| No. | insertion loss (dB) | dispersion value (ps/nm) | dispersion slope (ps/nm$^2$) | dispersion slope compensation ratio (%) | $A_{eff}$ (μm$^2$) | PMD at wavelength band of 1590 nm (ps) |
|---|---|---|---|---|---|---|
| module G | 2.15 | −380 | −0.95 | 89 | 24.7 | 0.2 |
| module H | 3.51 | −760 | −1.90 | 89 | 24.7 | 0.3 |
| module I | 6.04 | −1520 | −4.05 | 95 | 23.7 | 0.4 |

(wavelength: 1590 nm)

Figure 4:
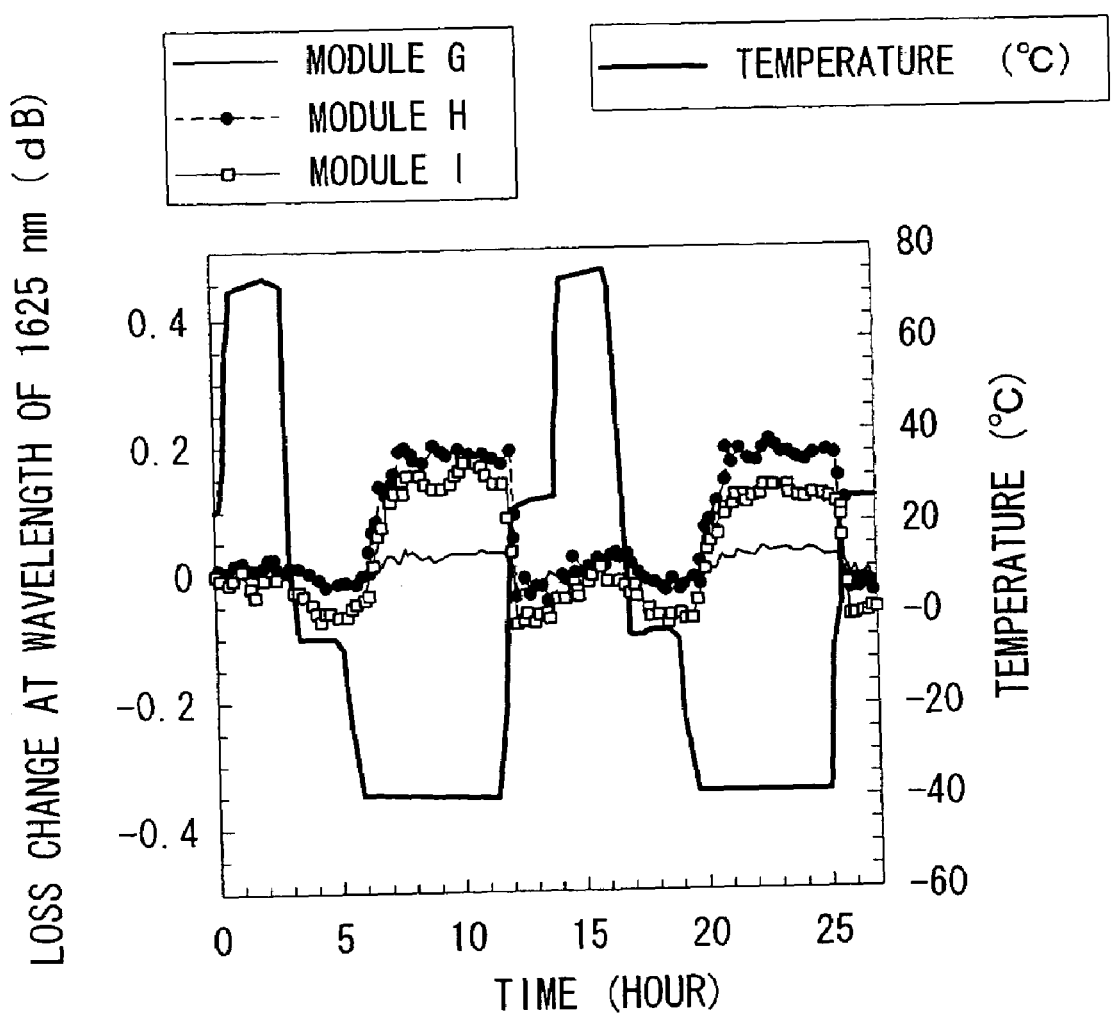
FIG. 4 shows the relationships between the loss change and the temperature change of dispersion compensating optical fiber modules in examples according to the present invention.

Moreover, temperature characteristics of the insertion loss of the dispersion compensating optical fiber modules were measured at a wavelength of 1625 nm which is the longest wavelength in the employed wavelength band. Obtained results are shown in FIG. 4. As shown in FIG. 4, the maximum value of the loss change was 0.2 dB or less in the temperature range of −40 to +75° C., and the temperature characteristics were improved.

Next, comparative examples will be shown so as to compare them with the aforementioned examples.

Comparative Example 1

Five dispersion compensating optical fiber preforms were produced by an MCVD method or a PCVD method. Then, dispersion compensating optical fibers were produced by drawing the dispersion compensating optical fiber preforms. The drawing step of each of the dispersion compensating optical fiber preforms was carried out by using ultraviolet light curable resin under the conditions in which the atmospheric oxygen concentration during curing the ultraviolet light resin was not controlled.

Each of the dispersion compensating optical fibers has the same profile as shown in FIG. 1 and properties shown in TABLE 1. The adhesive property of each of the produced dispersion compensating optical fibers was 15 gf/mm.

By using the dispersion compensating optical fibers each having the same profile as that of the dispersion compensating optical fibers A or B, five dispersion compensating optical fiber modules (J to N) each of which has a dispersion compensation value different from the others were produced.

Characteristics of the dispersion compensating optical fiber modules were shown in TABLE 6. As shown in TABLE 6, results of the characteristics required for the dispersion compensating optical fiber modules, such as dispersion slope compensation ratio, insertion loss, PMD, and the like are satisfactory.

fiber can satisfactorily compensate for the chromatic dispersion and the dispersion slope while suppressing the loss increase in accordance with the broad temperature change, which is caused by adhering portions of the dispersion compensating optical fiber to other portions thereof when winding the dispersion compensating optical fiber into a coil to form the dispersion compensating optical fiber module. Thus, according to the present invention, it is possible to prevent the loss increase of the dispersion compensating optical fiber module and to miniaturize the dispersion compensating optical fiber module.

Figure 9A:
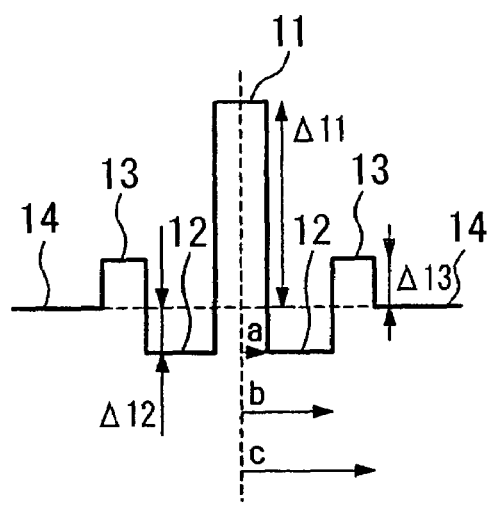
FIGS. 9A to 9C show various refractive index profiles of the dispersion compensating optical fibers according to the present invention.
Figure 9B:
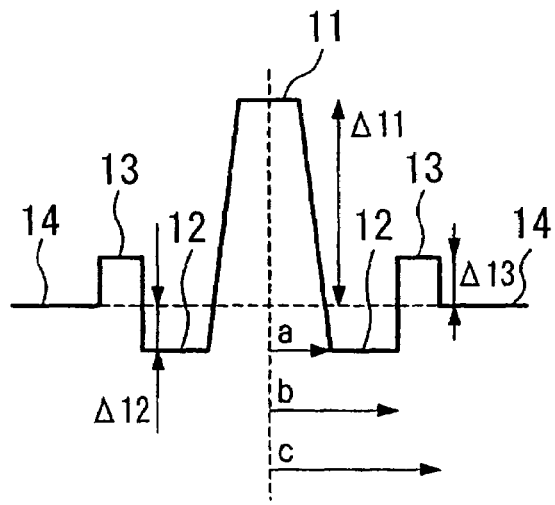
Figure 9C:
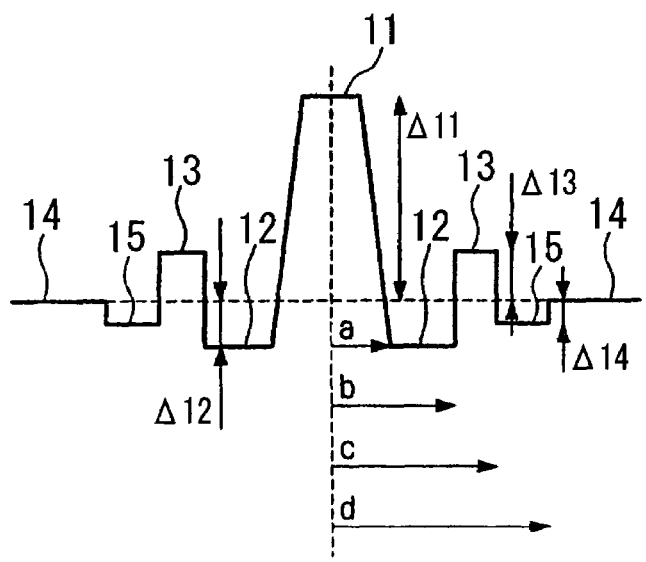

FIGS. 9A to 9C show further examples of refractive index profiles of the dispersion compensating fibers according to the present invention.

In FIGS. 9A to 9C, reference numeral 11 indicates a central core region, reference numeral 12 indicates a depressed core region located around the central core region 11, reference numeral 13 indicates a ring core region located around the depressed core region 12, and reference numeral 14 indicates a cladding located around the ring core region 13.

In FIGS. 9A to 9C, reference symbol "a" indicates the radius of the central core region 11, reference symbol "b" indicates the radius of the depressed core region 12, reference symbol "c" indicates the radius of the ring core region 13, reference symbol $\Delta 11$ indicates the relative refractive index difference of the central core region 11 relative to the cladding 14, reference symbol $\Delta 12$ indicates the relative refractive index difference of the depressed core region 12 relative to the cladding 14, and reference symbol $\Delta 13$ indicates the relative refractive index difference of the ring core region 13 relative to the cladding 14.

The central core region 11 has a refractive index higher than that of the cladding 14, the depressed core region 12 has a refractive index less than that of the cladding 14, and the ring core region 13 has a refractive index higher than that of the cladding 14.

TABLE 6

| No. | insertion loss (dB) | dispersion value (ps/nm) | dispersion slope (ps/nm$^2$) | dispersion slope compensation ratio (%) | $A_{\it eff}$ ($\mu m^2$) | PMD at wavelength band of 1550 nm (ps) |
|---|---|---|---|---|---|---|
| module J | 2.08 | −340 | −1.09 | 92 | 21.7 | 0.2 |
| module K | 3.36 | −680 | −2.18 | 92 | 21.7 | 0.3 |
| module L | 3.22 | −680 | −2.12 | 89 | 20.7 | 0.4 |
| module M | 5.91 | −1360 | −4.36 | 92 | 21.7 | 0.3 |
| module N | 5.63 | −1360 | −4.23 | 89 | 20.7 | 0.4 |

(wavelength: 1550 nm)

Figure 5:
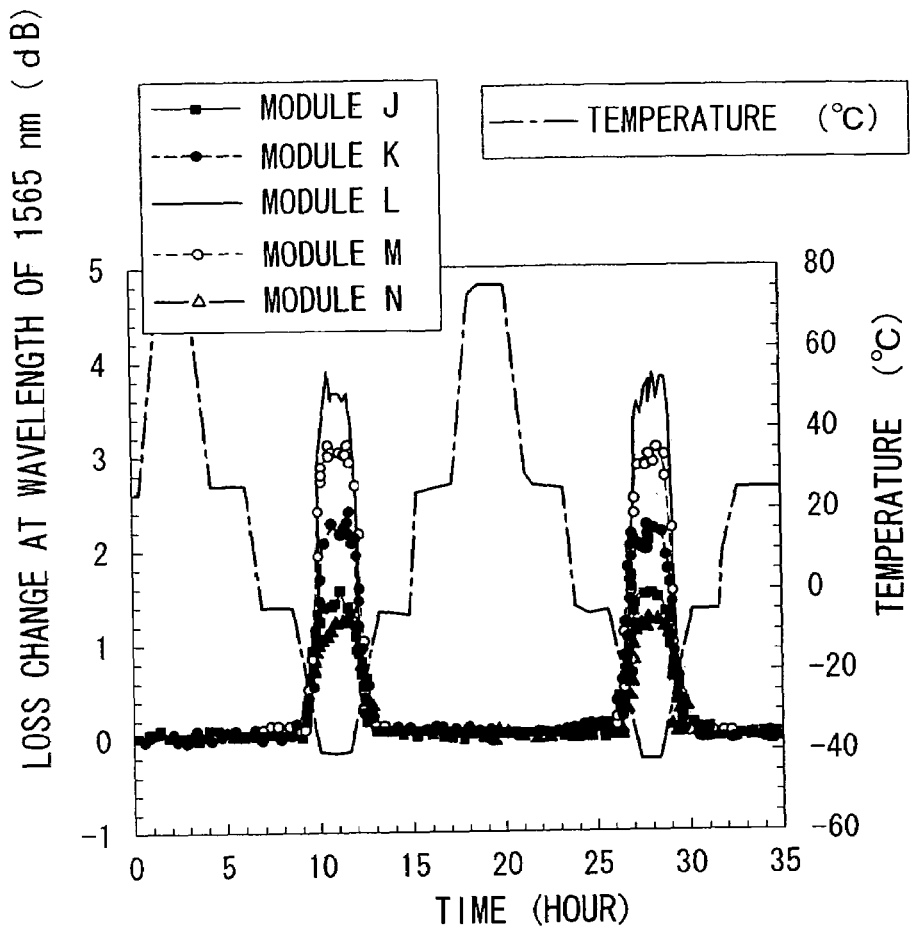
FIG. 5 shows the relationships between the loss change and the temperature change of dispersion compensating optical fiber modules in comparative examples.
Figure 6:
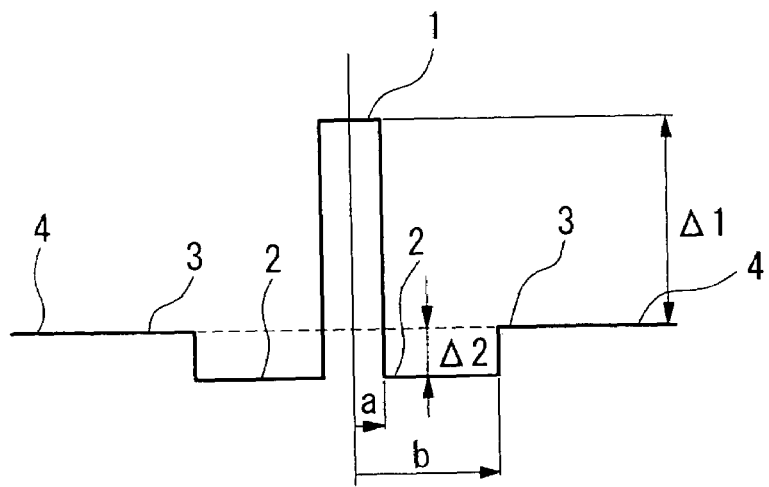
FIG. 6 shows a refractive index profile of a conventional dispersion compensating optical fiber.

Temperature characteristics of the insertion loss of the dispersion compensating optical fiber modules are shown in FIG. 5. As shown in FIG. 5, the loss increase is approximately 2 dB at the low temperature region near −40° C., and a large loss increase more than 3 dB is seen at the low temperature region of −40° C. That is because the dispersion compensating optical fiber modules were produced from the dispersion compensating optical fibers each of which has an adhesive property of 15 gf/mm, which is larger than those of the dispersion compensating optical fibers in Examples.

As described above, since the dispersion compensating optical fiber according to the present invention has a low adhesive property, the dispersion compensating optical fiber module produced from the dispersion compensating optical FIG. 9C shows an example of a refractive index profile of a dispersion compensating fiber in which a further layer 15 having a refractive index less than that of the cladding 14 is provided between the ring core region 13 and the cladding 14. In FIG. 9C, reference symbol "d" indicates the radius of the further layer 15, and reference symbol $\Delta 14$ indicates the relative refractive index difference of the further layer 15 relative to the cladding 14.

In a first embodiment of the dispersion compensating fiber according to the present invention, the radius of the ring core region 13 is set to be between 6.5 µm and 9.5 µm, the radius ratio b/a of the depressed core region 12 relative to the central core region 11 is set to be between 2.0 and 4.0, the radius ratio c/b of the ring core region 13 relative to the depressed core region 12 is set to be between 1.1 and 2.0, the relative refractive index difference Δ11 of the central core region 11 relative to the cladding 14 is set to be between +1.00% and +1.90%, the relative refractive index difference Δ12 of the depressed core region 12 relative to the cladding 14 is set to be between −0.60% and −1.00%, and the relative refractive index difference Δ13 of the ring core region 13 relative to the cladding 14 is set to be between +0.20% and +1.00%. The radius ratio d/c of the further layer 15 between the ring core region 13 and the cladding 14 relative to the ring core region 13 is preferably set to be between 1.3 and 1.8, and the relative refractive index difference Δ14 of the further layer 15 relative to the cladding 14 is preferably set to be between −0.04% and −0.20%.

By setting the refractive index profile to be as described above, it is possible to manufacture a dispersion compensating fiber in which at at least one wavelength selected from the range from 1.53 µm to 1.63 µm, the chromatic dispersion is in a range from −50 ps/nm/km to −150 ps/nm/km, the dispersion slope is in a range from −0.25 ps/nm²/km to −3.0 ps/nm²/km, More specific examples of the dispersion compensating fibers according to the present invention will be explained below with reference to FIGS. 9A to 9C.

Examples 1A to 1D

Four examples 1A to 1D of the dispersion compensating fibers in each of which the refractive index profile was set as shown in FIG. 9C, and the physical parameters Δ11, Δ12, Δ13, Δ14, b/a, c/b, and d/c were set as shown in TABLE 7, were manufactured using known manufacturing methods, such as the VAD method, the MCVD method, and the PCVD method. Please note that the dispersion compensating fiber 1D has the refractive index profile shown in FIG. 9B because, in this case, the layer 15 is not provided between the ring core region 13 and the cladding 14 as is shown in TABLE 7 that Δ14=0.

TABLE 7 also shows the optical properties of the dispersion compensating fibers 1A to 1D.

TABLE 7

| Symbol | Δ11 (%) | Δ12 (%) | Δ13 (%) | Δ14 (%) | b/a | c/b | d/c | Core diameter (µm) | Wavelength (µm) | $A_{eff}$ (µm²) | Transmission loss (dB/km) | Chromatic dispersion (ps/nm/km) | Dispersion slope (ps/nm²/km) | RDS (nm⁻¹) | Bending loss (dB/m) 2R = 20 mm |
|---|---|---|---|---|---|---|---|---|---|---|---|---|---|---|---|
| 1A | 1.20 | −0.70 | 0.45 | −0.06 | 2.8 | 1.50 | 1.61 | 7.7 | 1.55 | 19 | 0.35 | −98 | −0.86 | 0.0088 | 15 |
| 1B | 1.45 | −0.70 | 0.40 | −0.06 | 2.6 | 1.45 | 1.61 | 7.6 | 1.55 | 16 | 0.30 | −84 | −0.88 | 0.010 | 23 |
| 1C | 1.20 | −0.70 | 0.45 | −0.06 | 2.7 | 1.40 | 1.6 | 7.6 | 1.55 | 16 | 0.40 | −54 | −0.86 | 0.016 | 20 |
| 1D | 1.54 | −0.94 | 0.34 | 0 | 2.6 | 1.77 | — | 7.3 | 1.55 | 15 | 0.38 | −131 | −1.12 | 0.0085 | 3 | and the RDS is in a range from 0.005 nm⁻¹ to 0.020 nm⁻¹, and which has a cut-off wavelength which substantially enables single mode transmission.

In a second embodiment, the radius of the ring core region 13 is set to be between 6.5 µm and 9.5 µm, the radius ratio b/a of the depressed core region 12 relative to the central core-region 11 is set to be between 2.0 and 3.5, the radius ratio c/b of the ring core region 13 relative to the depressed core region 12 is set to be between 1.1 and 1.5, the relative refractive index difference Δ11 of the central core region 11 relative to the cladding 14 is set to be between +1.30% and +1.80%, the relative refractive index difference Δ12 of the depressed core region 12 relative to the cladding 14 is set to be between −0.68% and −0.75%, and the relative refractive index difference Δ13 of the ring core region 13 relative to the cladding 14 is set to be between +0.3% and +0.6%. The radius ratio d/c of the further layer 15 between the ring core region 13 and the cladding 14 relative to the ring core region 13 is preferably set to be between 1.3 and 1.8, and the relative refractive index difference Δ14 of the further layer 15 relative to the cladding 14 is preferably set to be between −0.04% and −0.20%.

By setting the refractive index profile to be as described above, it is possible to manufacture a dispersion compensating fiber in which at at least one wavelength selected from the range from 1.53 µm to 1.63 µm, the chromatic dispersion is in a range from −50 ps/nm/km to −100 ps/nm/km, the dispersion slope is in a range from 0.25 ps/nm²/km to −2.0 ps/nm²/km, and the RDS is in a range from 0.005 nm⁻¹ to 0.020 nm⁻¹, and which has a cut-off wavelength which substantially enables single mode transmission.

The RDS in the optical fiber A is 0.0088 nm⁻¹, the RDS in the optical fiber 1B is 0.010 nm⁻¹, the RDS in the optical fiber 1C is 0.016 nm⁻¹, and the RDS in the optical fiber 1D is 0.0085 nm⁻¹. In these dispersion compensating fibers, the RDSs larger than that in conventional dispersion compensating fibers are obtained even though the absolute values of the chromatic dispersion are relatively large. Accordingly, it is possible to compensate the residual chromatic dispersion over a broad wavelength range in the NZ-DSFs forming optical transmission paths, whereby transmission rate may be increased.

In addition, in any of the optical fibers 1A to 1D, the transmission loss is less than 0.5 dB/km. Furthermore, the bending loss at a diameter of 20 mm at the longest wavelength in the wavelength band selected from 1.53 µm to 1.63 µm can be equal to or less than 100 dB/m, and specifically in the case of the optical fibers 1A and 1D, the bending loss at a diameter of 20 mm can be equal to or less than 20 dB/m.

Examples 1E and 1F

Two examples 1E and 1F of the dispersion compensating fibers in each of which the refractive index profile was set as shown in FIG. 9C, and the physical parameters Δ11, Δ12, Δ13, Δ14, b/a, c/b, and d/c were set as shown in TABLE 8, were manufactured using known manufacturing methods, such as the VAD method, the MCVD method, and the PCVD method.

TABLE 8 also shows the optical properties of the dispersion compensating fibers 1E and 1F.

TABLE 8

| Symbol | Δ11 (%) | Δ12 (%) | Δ13 (%) | Δ14 (%) | b/a | c/b | d/c | Core diameter (μm) | Wavelength (μm) | $A_{eff}$ (μm²) | Transmission loss (dB/km) | Chromatic dispersion (ps/nm/km) | Dispersion slope (ps/nm²/km) | RDS (nm⁻¹) | Bending loss (dB/m) 2R = 20 mm |
|---|---|---|---|---|---|---|---|---|---|---|---|---|---|---|---|
| 1E | 1.80 | −0.70 | 0.40 | −0.10 | 2.5 | 1.46 | 1.61 | 7.3 | 1.59 | 15 | 0.33 | −60 | −0.42 | 0.007 | 6 |
| 1F | 1.65 | −0.70 | 0.45 | −0.07 | 2.5 | 1.46 | 1.61 | 7.3 | 1.59 | 16 | 0.33 | −60 | −0.66 | 0.011 | 12 |

The RDS in the optical fiber 1E is 0.007 nm⁻¹, and the RDS in the optical fiber 1F is 0.011 nm⁻¹. In these dispersion compensating fibers, the RDSs larger than that in conventional dispersion compensating fibers are obtained even though the absolute values of the chromatic dispersion are relatively large. Accordingly, it is possible to compensate the residual chromatic dispersion over a broad wavelength range in the NZ-DSFs forming optical transmission paths, whereby transmission rate may be increased.

In addition, in any of the optical fibers 1E and 1F, the transmission loss is less than 0.5 dB/km. Furthermore, the bending loss at a diameter of 20 mm at the longest wavelength in the wavelength band selected from 1.53 μm to 1.63 μm can be equal to or less than 20 dB/m.

By using the physical parameters in these examples, large absolute values of the dispersion slope can be obtained even though the absolute values of the chromatic dispersion are relatively large, and dispersion compensating fibers with a large RDS can thus be obtained, whereby it is possible to effectively compensate the dispersion slope in NZ-DSF having a chromatic dispersion of approximately a few ps/nm/km in the 1.55 μm band.

Accordingly, it is possible to compensate the residual chromatic dispersion over a broad wavelength range in the NZ-DSFs forming optical transmission paths, whereby transmission rate may be increased.

According to the present invention, a dispersion compensating fiber which has a low transmission loss, and in which transmission loss is not increased even when it is wound around a small reel, can be obtained.

In addition, by using the dispersion compensating fibers described above, it is possible to form a dispersion compensating fiber module which may be compact.

In a third embodiment of the dispersion compensating fiber according to the present invention, the radius of the ring core region 13 is set to be between 6.7 μm and 10.7 μm, the radius ratio b/a of the depressed core region 12 relative to the central core region 11 is set to be between 2.0 and 3.0, the radius ratio c/b of the ring core region 13 relative to the depressed core region 12 is set to be between 1.3 and 2.0, the relative refractive index difference Δ11 of the central core region 11 relative to the cladding 14 is set to be between +1.00% and +1.80%, the relative refractive index difference Δ12 of the depressed core region 12 relative to the cladding 14 is set to be between −1.20% and −1.50%, and the relative refractive index difference Δ13 of the ring core region 13 relative to the cladding 14 is set to be between +0.20% and +0.50%.

The radius ratio d/c of the further layer 15 between the ring core region 13 and the cladding 14 relative to the ring core region 13 is preferably set to be between 1.3 and 2.0, and the relative refractive index difference Δ14 of the further layer 15 relative to the cladding 14 is preferably set to be between −0.04% and −0.12%.

By setting the refractive index profile to be as described above, it is possible to manufacture a dispersion compensating fiber in which at at least one wavelength selected from the range from 1.53 μm to 1.57 μm, the chromatic dispersion is in a range from −20 ps/nm/km to −140 ps/nm/km, and the RDS is in a range from 0.016 nm⁻¹ to 0.024 nm⁻¹, and which has a cut-off wavelength which substantially enables single mode transmission at a use length when it is used by being wound, for example, around a reel.

Please note that trial-and-error during manufacturing may be required to obtain dispersion compensating fibers with the preferred optical properties described above, even when all physical parameters are set within the above-suggested ranges.

In a fourth embodiment of the dispersion compensating fiber according to the present invention, the radius of the ring core region 13 is set to be between 6.7 μm and 8.7 μm, the radius ratio b/a of the depressed core region 12 relative to the central core region 11 is set to be between 2.0 and 3.0, the radius ratio c/b of the ring core region 13 relative to the depressed core region 12 is set to be between 1.4 and 2.0, the relative refractive index difference Δ11 of the central core region 11 relative to the cladding 14 is set to be between +1.30% and +1.60%, the relative refractive index difference Δ12 of the depressed core region 12 relative to the cladding 14 is set to be between −1.20% and −1.50%, and the relative refractive index difference Δ13 of the ring core region 13 relative to the cladding 14 is set to be between +0.2% and +0.4%.

The radius ratio d/c of the further layer 15 between the ring core region 13 and the cladding 14 relative to the ring core region 13 is preferably set to be between 1.3 and 2.0, and the relative refractive index difference Δ14 of the further layer 15 relative to the cladding 14 is preferably set to be between −0.04% and −0.12%.

By setting the refractive index profile to be as described above, it is possible to manufacture a dispersion compensating fiber in which at at least one wavelength selected from the range from 1.53 μm to 1.57 μm, the chromatic dispersion is in a range from −40 ps/nm/km to −90 ps/nm/km, and the RDS is in a range from 0.016 nm⁻¹ to 0.024 nm⁻¹, and which has a cut-off wavelength which substantially enables single mode transmission at a use length when it is used by being wound, for example, around a reel.

Please note that trial-and-error during manufacturing may be required to obtain dispersion compensating fibers with the preferred optical properties described above, even when all physical parameters are set within the above-suggested ranges.

Next, an embodiment of the dispersion compensating fiber module according to the present invention will be explained.

The dispersion compensating fiber module according to this embodiment is formed by winding the above-described dispersion compensating fiber around a reel having a cylinder diameter equal to or less than 100 mm, which may be more than 100 mm in some cases, and by connecting S-SMF or NZ-DSFs to both ends of the dispersion compensating fiber.

Intermediate optical fibers may be connected to both ends of the dispersion compensating fiber, and S-SMF or 1.55 μm band NZ-DSFs may be connected to both open ends of the intermediate optical fibers. In such cases, the purpose of using the intermediate optical fibers is to adjust the mode field diameter of optical fibers to be connected so as to reduce the connection loss when the optical fibers are connected. The intermediate optical fibers are preferably optical fibers which has a field pattern similar to that of the dispersion compensating fiber, which can be connected to the dispersion compensating fiber using an arc-fusion splice method with low temperature, and whose bending loss is not degraded even when it is connected using an arc-fusion splice method with high temperature.

When dispersion compensating fibers are connected to S-SMF, or to NZ-DSF via intermediate optical fibers as described above, temperature and time of heating at each connecting portion is preferably controlled, and tension along the optical fibers is preferably applied to each connecting portion during heating. By using such measures, it is possible to suppress overall connection losses at both ends of the intermediate optical fiber to be less than 1 dB.

In the above dispersion compensating fiber module, the dispersion compensating fiber is preferably wound around a reel with a winding tension controlled to be between 20 gf and 50 gf. This tension range is preferable because, when the tension is less than 20 gf, dislocation of the dispersion compensating fiber may occur due to vibration or shock, which could cause unstable characteristics, and when the tension is greater than 50 gf, transmission loss may be increased or polarization mode dispersion may be degraded due to side pressure during winding.

Further specific examples of the dispersion compensating fibers according to the present invention will be explained below with reference to FIGS. 9A to 9C.

Examples 1G to 1K

Five examples 1G to 1K of the dispersion compensating fibers in each of which the refractive index profile was set as shown in FIG. 9C, and the physical parameters $\Delta 11$, $\Delta 12$, $\Delta 13$, $\Delta 14$, b/a, c/b, and d/c were set as shown in TABLE 9, were manufactured using known manufacturing methods, such as the VAD method, the MCVD method, and the PCVD method. Please note that the dispersion compensating fiber L has the refractive index profile shown in FIG. 9B because, in this case, the layer 15 is not provided between the ring core region 13 and the cladding 14 as is shown in TABLE 9 that $\Delta 14 = 0$.

TABLE 9 also shows the optical properties of the dispersion compensating fibers 1G to 1K.

The RDS in the optical fiber 1G is 0.0201 nm$^{-1}$, the RDS in the optical fiber 1H is 0.0197 nm$^{-1}$, the RDS in the optical fiber 1I is 0.0191 nm$^{-1}$, the RDS in the optical fiber 1J is 0.0190 nm$^{-1}$, and the RDS in the optical fiber 1K is 0.0191 nm$^{-1}$. In these dispersion compensating fibers, the RDSs larger than that in conventional dispersion compensating fibers are obtained even though the absolute values of the chromatic dispersion are relatively large. Accordingly, it is possible to compensate the residual chromatic dispersion over a broad wavelength range in the NZ-DSFs forming optical transmission paths, whereby transmission rate may be increased.

In addition, in any of the optical fibers 1G to 1K, the transmission loss is less than 0.7 dB/km. Furthermore, the bending loss at a diameter of 20 mm at the longest wavelength in the wavelength band selected from 1.53 μm to 1.57 μm can be equal to or less than 40 dB/m, and specifically in the case of the optical fibers 1G, 1H, 1J, and 1K, the bending loss at a diameter of 20 mm can be equal to or less than 10 dB/m.

In order to form the dispersion compensating fiber modules 1A to 1E for NZ-DSF, whose optical properties are shown in TABLE 10, respectively, each of the dispersion compensating fibers 1G to 1K shown in TABLE 9 was wound around a small reel having a cylinder diameter of 80 mm with a winding tension of 40 gf so as to form a small coil, the intermediate optical fibers were connected to the both ends of the dispersion compensating fiber so that connection loss was reduced, and S-SMFs were connected to both open ends of the intermediate optical fibers so as to form input/output ends. All of the dispersion compensating fiber modules 1A to 1E are dispersion compensating fiber modules for compensating dispersion in 100 km long NZ-DSFs.

TABLE 10

| Symbol | Wavelength (μm) | Module loss (dB) | Module dispersion (ps/nm) | Module dispersion slope (ps/nm²) | RDS (nm$^{-1}$) |
|---|---|---|---|---|---|
| Module 1A | 1.55 | 3.78 | −450 | −9.05 | 0.0201 |
| Module 1B | 1.55 | 6.26 | −451 | −8.88 | 0.0197 |
| Module 1C | 1.55 | 2.32 | −448 | −8.56 | 0.0191 |
| Module 1D | 1.55 | 2.74 | −450 | −8.55 | 0.0190 |
| Module 1E | 1.55 | 4.43 | −453 | −8.65 | 0.0191 |

All of the dispersion compensating fiber modules 1A to 1E are dispersion compensating fiber modules with low module losses, in which the RDSs are in a range between 0.016 nm$^{-1}$ and 0.024 nm$^{-1}$, increase of module losses due to winding is prevented. Accordingly, it is possible to compensate the residual chromatic dispersion over a broad wavelength range in the NZ-DSFs forming optical transmission paths, whereby transmission rate may be increased.

TABLE 9

| Symbol | $\Delta 11$ (%) | $\Delta 12$ (%) | $\Delta 13$ (%) | $\Delta 14$ (%) | b/a | c/b | d/c | Core diameter (μm) | Wavelength (μm) | $A_{eff}$ (μm²) | Transmission loss (dB/km) | Chromatic dispersion (ps/nm/km) | Dispersion slope (ps/nm²/km) | RDS (nm$^{-1}$) | Bending loss (dB/m) 2R = 20 mm Wavelength = 1.57 μm |
|---|---|---|---|---|---|---|---|---|---|---|---|---|---|---|---|
| 1G | 1.45 | −1.50 | 0.30 | −0.06 | 2.6 | 1.6 | 1.6 | 7.2 | 1.55 | 12 | 0.38 | −57.5 | −1.16 | 0.0201 | 9 |
| 1H | 1.10 | −1.20 | 0.20 | −0.06 | 2.4 | 1.8 | 1.6 | 8.6 | 1.55 | 15 | 0.30 | −23.2 | −0.457 | 0.0197 | 8 |
| 1I | 1.70 | −1.40 | 0.20 | −0.06 | 2.6 | 2.0 | 1.6 | 7.8 | 1.55 | 11 | 0.45 | −138 | −2.64 | 0.0191 | 16 |
| 1J | 1.80 | −1.30 | 0.30 | 0 | 3.0 | 1.7 | — | 7.2 | 1.55 | 10 | 0.47 | −117 | −2.22 | 0.0190 | 8 |
| 1K | 1.42 | −1.45 | 0.26 | −0.10 | 2.6 | 1.7 | 1.6 | 7.7 | 1.55 | 12 | 0.35 | −42.6 | −0.814 | 0.0191 | 4 |

According to the above examples of dispersion compensating fibers, a large RDS such as within a range between 0.016 nm$^{-1}$ and 0.024 nm$^{-1}$ can be obtained even though the absolute value of the chromatic dispersion is large, and dispersion slope in NZ-DSF having the chromatic dispersion of +4.5 ps/nm/km and the dispersion slope of +0.09 ps/nm$^2$/km in the 1.55 μm band can effectively be compensated.

Accordingly, it is possible to compensate the residual chromatic dispersion over a broad wavelength range in the NZ-DSFs forming optical transmission paths, whereby transmission rate may be increased so as to form high speed optical transmission paths in which the transmission rate is, for example, 40 Gb/s.

In addition, in the above examples of dispersion compensating fibers, transmission loss is minimized, and increase of transmission loss can be prevented even when the fibers are wound around a small reel.

Furthermore, when a dispersion compensating fiber module is formed by connecting intermediate optical fibers to both ends of the dispersion compensating fiber wound around a reel, and by connecting S-SMFs or NZ-DSFs to both open ends of the intermediate optical fibers, the mode field diameter can be adjusted at each connection point, whereby connection loss can be reduced, and the dispersion compensating fiber module may be compact.

When dispersion compensating fibers are connected to S-SMF, or to NZ-DSF via intermediate optical fibers, and if tension along the optical fibers is applied to each connecting portion, it is possible to suppress overall connection losses at both ends of the intermediate optical fibers to be less than 1 dB, whereby a dispersion compensating fiber module with a low module loss can be obtained.

In addition, by controlling the winding tension to be between 20 gf and 50 gf when the dispersion compensating fiber is wound around a reel, a dispersion compensating fiber module can be obtained, in which dislocation of the dispersion compensating fiber due to vibration or shock can be prevented, and also increase of module loss and degradation of polarization mode dispersion properties can be prevented.

As explained above, according to the first aspect of the present invention, large absolute values of the dispersion slope can be obtained even though the absolute values of the chromatic dispersion are relatively large, and dispersion compensating fibers with a large RDS can thus be obtained, whereby it is possible to effectively compensate dispersion slope in NZ-DSF having a chromatic dispersion of approximately a few ps/run/km in the 1.55 μm band.

Accordingly, it is possible to compensate the residual chromatic dispersion over a broad wavelength range in the NZ-DSFs forming optical transmission paths, whereby transmission rate may be increased.

According to another aspect of the present invention, a dispersion compensating fiber which has a low transmission loss, and in which transmission loss is not increased even when it is wound around a small reel, can be obtained.

In addition, by using the dispersion compensating fibers described above, it is possible to form a dispersion compensating fiber module which may be compact.

According to another aspect of the present invention, by setting the radius of the ring core region to be in a range from 6.7 μm to 10.7 μm, the radius ratio of the depressed core region relative to the central core region to be in a range from 2.0 to 3.0, the radius ratio of the ring core region relative to the depressed core region to be in a range from 1.3 to 2.0, the relative refractive index difference of the central core region relative to the cladding to be in a range from +1.00% to +1.80%, the relative refractive index difference of the depressed core region relative to the cladding to be in a range from −1.20% to −1.50%, and the relative refractive index difference of the ring core region relative to the cladding to be in a range from +0.20% to +0.50%, a dispersion compensating fiber can be obtained in which at least one wavelength selected from the range from 1.53 μm to 1.57 μm, the chromatic dispersion is in a range from −20 ps/nm/km to −140 ps/nm/km, the ratio of the dispersion slope relative to the chromatic dispersion is in a range from 0.016 nm$^{-1}$ to 0.024 nm$^{-1}$. In this case, the dispersion compensating fiber could have a cut-off wavelength which substantially enables single mode transmission at a use length when it is used in a wound state, and in which a large RDS could be obtained even though the absolute value of the chromatic dispersion is relatively large.

Accordingly, it is possible to obtain a dispersion compensating fiber which can effectively compensate the dispersion slope even for the NZ-DSF having the chromatic dispersion of about +4.5 ps/nm/km and the dispersion slope of about +0.09 ps/nm$^2$/km in the 1.55 μm band.

Furthermore, it is possible to compensate the residual chromatic dispersion over a broad wavelength range, whereby transmission rate may be increased, and high speed optical transmission paths in which the transmission rate is, for example, 40 Gb/s, can be constructed.

In addition, a dispersion compensating fiber which has a low transmission loss, and in which transmission loss is not increased even when it is wound around a small reel, can be obtained.

The advantageous effects described above can also be obtained by providing a dispersion compensating fiber in which the radius of the ring core region is set in a range from 6.7 μm to 8.7 μm, the radius ratio of the depressed core region relative to the central core region is set in a range from 2.0 to 3.0, the radius ratio of the ring core region relative to the depressed core region is set in a range from 1.4 to 2.0, the relative refractive index difference of the central core region relative to the cladding is set in a range from +1.40% to +1.80%, the relative refractive index difference of the depressed core region relative to the cladding is set in a range from −1.20% to −1.50%, and the relative refractive index difference of the ring core region relative to the cladding is set in a range from +0.20% to +0.50%, and in which at least one wavelength selected from the range from 1.53 μm to 1.57 μm, chromatic dispersion of the dispersion compensating fiber is in a range from −40 ps/nm/km to −90 ps/nm/km, the ratio of the dispersion slope relative to the chromatic dispersion is in a range from 0.016 nm$^{-1}$ to 0.024 nm$^{-1}$, and which has a cut-off wavelength which substantially enables single mode transmission at a use length when it is used in a wound state.

According to another aspect of the present invention, when a dispersion compensating fiber module is formed by connecting intermediate optical fibers to both ends of the dispersion compensating fiber wound around a reel, and by connecting S-SMFs or NZ-DSFs to both open ends of the intermediate optical fibers, the mode field diameter can be adjusted at each connection point, whereby connection loss can be reduced, and the dispersion compensating fiber module may be compact.

In addition, when dispersion compensating fibers are connected to S-SMF, or to NZ-DSF via intermediate optical fibers, and if tension along the optical fibers is applied to each connecting portion, it is possible to suppress overall connection losses at both ends of the intermediate optical fibers to be less than 1 dB, whereby a dispersion compensating fiber module with a low module loss can be obtained.

Furthermore, by controlling the winding tension to be between 20 gf and 50 gf when the dispersion compensating fiber is wound around a reel, a dispersion compensating fiber module can be obtained, in which dislocation of the dispersion compensating fiber due to vibration or shock can be prevented, and also increase of module loss and degradation of polarization mode dispersion properties can be prevented.

What is claimed is:

1. A dispersion compensating optical fiber comprising:
an uncovered dispersion compensating optical fiber;
a double-layered resin coating disposed around the uncovered dispersion compensating optical fiber; and
an outer coating layer having a thickness of 3 to 7 µm, containing silicone in an amount of 1 to 5% by weight, and disposed around the double-layered resin coating,
wherein the outer diameter of the uncovered dispersion compensating optical fiber is in a range from 90 to 125 µm, an outer diameter of the dispersion compensating optical fiber is in a range from 180 to 250 µm,
wherein the uncovered dispersion compensating optical fiber comprises:
a cladding;
a central core region having a higher refractive index than that of the cladding;
a depressed core region which is located around the central core region, and which has a lower refractive index than that of the cladding; and
a ring core region which is located around the depressed core region and inside the cladding, and which has a higher refractive index than that of the cladding,
wherein the radius of the ring core region is set in a range from 6.5 µm to 9.5 µm, the radius ratio of the depressed core region relative to the central core region is set in a range from 2.0 to 4.0, and the radius ratio of the ring core region relative to the depressed core region is set in a range from 1.1 to 2.0,
wherein the relative refractive index difference of the central core region relative to the cladding is set in a range from +1.00% to +1.90%, the relative refractive index difference of the depressed core region relative to the cladding is set in a range from −0.60% to −1.00%, and the relative refractive index difference of the ring core region relative to the cladding is set in a range from +0.20% to +1.00%, and
wherein at at least one wavelength selected from the range from 1.53 µm to 1.63 µm, chromatic dispersion of the dispersion compensating fiber is in a range from −50 ps/nm/km to −150 ps/nm/km, the dispersion slope is in a range from −0.25 ps/nm²/km to −3.0 ps/nm²/km, the ratio of the dispersion slope relative to the chromatic dispersion is in a range from 0.005 nm$^{-1}$ to 0.020 nm$^{-1}$, and the dispersion compensating fiber has a cut-off wavelength which substantially enables single mode transmission.

2. A dispersion compensating optical fiber according to claim 1, wherein the amount of silicone contained in the outer coating layer is determined such that an adhesive property, which is defined by a drawing force required to longitudinally draw out a resin-coated optical fiber from a bundle of resin-coated optical fibers, of the outer coating layer is 1 gf/mm or less.

3. A dispersion compensating optical fiber according to claim 1, wherein the outer coating layer includes an ultraviolet light curable urethane acrylate resin containing a coloring agent.

4. A dispersion compensating optical fiber according to claim 1, wherein the outer coating layer is formed by a step different from an optical fiber drawing step.

5. A dispersion compensating optical fiber according to claim 1, wherein the transmission loss is not more than 0.5 dB/km, and the bending loss at a diameter of 20 mm at the longest wavelength in the wavelength band selected from 1.53 µm to 1.63 µm is not more than 100 dB/m.

6. A dispersion compensating optical fiber according to claim 1, wherein the transmission loss is not more than 0.5 dB/km, and the bending loss at a diameter of 20 mm at the longest wavelength in the wavelength band selected from 1.53 µm to 1.63 µm is not more than 20 dB/m.

7. A dispersion compensating optical fiber according to claim 1, further comprising a layer which is located between the ring core region and the cladding, and which has a lower refractive index than that of the cladding.

8. A dispersion compensating optical fiber comprising:
an uncovered dispersion compensating optical fiber;
a double-layered resin coating disposed around the uncovered dispersion compensating optical fiber; and
an outer coating layer having a thickness of 3 to 7 µm, containing silicone in an amount of 1 to 5% by weight, and disposed around the double-layered resin coating,
wherein the outer diameter of the uncovered dispersion compensating optical fiber is in a range from 90 to 125 µm, an outer diameter of the dispersion compensating optical fiber is in a range from 180 to 250 µm, and the amount of silicone contained in the outer coating layer is determined such that an adhesive property of the outer coating layer is 1 gf/mm or less,
wherein the uncovered dispersion compensating optical fiber comprises:
a cladding;
a central core region having a higher refractive index than that of the cladding;
a depressed core region which is located around the central core region, and which has a lower refractive index than that of the cladding; and
a ring core region which is located around the depressed core region and inside the cladding, and which has a higher refractive index than that of the cladding,
wherein the radius of the ring core region is set in a range from 6.7 µm to 10.7 µm, the radius ratio of the depressed core region relative to the central core region is set in a range from 2.0 to 3.0, and the radius ratio of the ring core region relative to the depressed core region is set in a range from 1.3 to 2.0,
wherein the relative refractive index difference of the central core region relative to the cladding is set in a range from +1.00% to +1.80%, the relative refractive index difference of the depressed core region relative to the cladding is set in a range from −1.20% to −1.50%, and the relative refractive index difference of the ring core region relative to the cladding is set in a range from +0.20% to +0.50%, and
wherein at at least one wavelength selected from the range from 1.53 µm to 1.57 µm, chromatic dispersion of the dispersion compensating fiber is in a range from −20 ps/nm/km to −140 ps/nm/km, the ratio of the dispersion slope relative to the chromatic dispersion is in a range from 0.016 nm$^{-1}$ to 0.024 nm$^{-1}$, and the dispersion compensating fiber has a cut-off wavelength which substantially enables single mode transmission.

9. A dispersion compensating optical fiber according to claim 8, wherein the amount of silicone contained in the outer coating layer is determined such that an adhesive property, which is defined by a drawing force required to longitudinally draw out a resin-coated optical fiber from a bundle of resin-coated optical fibers, of the outer coating layer is 1 gf/mm or less.

10. A dispersion compensating optical fiber according to claim 8, wherein the outer coating layer includes an ultraviolet light curable urethane acrylate resin containing a coloring agent.

11. A dispersion compensating optical fiber according to claim 8, wherein the outer coating layer is formed by a step different from an optical fiber drawing step.

12. A dispersion compensating optical fiber according to claim 8, wherein the transmission loss is not more than 0.7 dB/km, and the bending loss at a diameter of 20 mm at the longest wavelength in the wavelength band selected from 1.53 μm to 1.57 μm is not more than 40 dB/m.

13. A dispersion compensating optical fiber according to claim 8, wherein the transmission loss is not more than 0.7 dB/km, and the bending loss at a diameter of 20 mm at the longest wavelength in the wavelength band selected from 1.53 μm to 1.57 μm is not more than 10 dB/m.

14. A dispersion compensating optical fiber module comprising:
a reel having a minimum diameter of 200 mm or less; and
a dispersion compensating optical fiber according to claim 1 wound around the reel at a winding tension of 20 to 70 gf.

15. A dispersion compensating optical fiber module according to claim 14, wherein the dispersion compensating optical fiber is wound at a winding tension of 30 to 50 gf.

16. A dispersion compensating optical fiber module comprising:
a reel having a minimum diameter of 200 mm or less; and
a dispersion compensating optical fiber according to claim 8 wound around the reel at a winding tension of 20 to 70 gf.

17. A dispersion compensating optical fiber module according to claim 16, wherein the dispersion compensating optical fiber is wound at a winding tension of 30 to 50 gf.

* * * * *

UNITED STATES PATENT AND TRADEMARK OFFICE
CERTIFICATE OF CORRECTION

PATENT NO. : 7,496,261 B2 Page 1 of 1
APPLICATION NO. : 11/203890
DATED : February 24, 2009
INVENTOR(S) : Aikawa et al.

It is certified that error appears in the above-identified patent and that said Letters Patent is hereby corrected as shown below:

Title page, item [30]

In the Foreign Application Priority Data, change "P2001-193556" to --P2001-193546--

Signed and Sealed this

Twenty-eighth Day of July, 2009

JOHN DOLL
*Acting Director of the United States Patent and Trademark Office*